3,755,411
HALO- OR OXY-SUBSTITUTED ALIPHATIC
DI-OLEFINIC NITRILES
Clive A. Henrick and John B. Siddall, Palo Alto, Calif., assignors to Zoecon Corporation, Palo Alto, Calif.
No Drawing. Continuation-in-part of applications Ser. No. 111,650, Ser. No. 111,702, Ser. No. 111,765, Ser. No. 111,766, and Ser. No. 111,770, all Feb. 1, 1971, and Ser. No. 115,725, Feb. 16, 1971, now Patent No. 3,706,733. This application Oct. 8, 1971, Ser. No. 187,897
Int. Cl. C07c 121/30
U.S. Cl. 260—465.6
11 Claims

ABSTRACT OF THE DISCLOSURE

Aliphatic hydrocarbon tri-olefinic and aliphatic substituted di-olefinic acids, esters, aldehydes, ketones, thiolesters, alcohols, thiols, halides, nitriles, amines, amides and derivatives thereof, intermediates therefor, syntheses thereof, and the control of insects, one embodiment of which is represented by the following formula

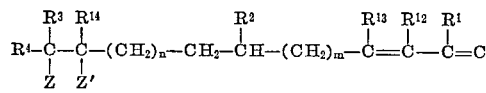

This application is a continuation-in-part of applications, Ser. No. 111,650, filed Feb. 1, 1971, Ser. No. 111,702, filed Feb. 1, 1971 now abandoned, Ser. No. 111,765, filed Feb. 1, 1971 now abandoned, Ser. No. 111,766, filed Feb. 1, 1971 now abandoned, Ser. No. 111,770, filed Feb. 1, 1971 now abandoned, and Ser. No. 115,725, filed Feb. 16, 1971, now U.S. Pat. 3,706,733 the entire disclosures of which are incorporated by reference.

This invention relates to novel aliphatic di-olefinic compounds, aliphatic tri-olefinic compounds, intermediates therefor, syntheses thereof, and the control of insects. More particularly, the novel di-olefinic compounds of the present invention are represented by the following formula:

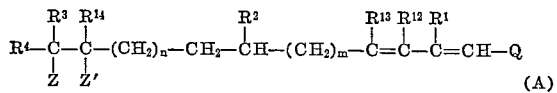

(A)

wherein,

Z is bromo, chloro, fluoro or the group —OR in which R is hydrogen, carboxylic acyl, lower alkyl, cycloalkyl, aralkyl or aryl;

Z' is hydrogen, bromo, chloro or fluoro;

each of $m$ and $n$ is zero or the positive integer one, two or three;

each of $R^1$ and $R^2$ is lower alkyl;

$R^4$ is alkyl;

each of $R^3$, $R^{12}$, $R^{13}$ and $R^{14}$ is hydrogen or lower alkyl; and

Q is one of the groups;

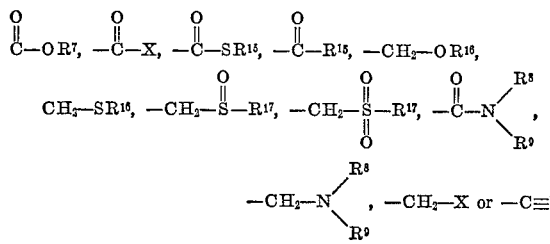

in which,

X is bromo, chloro or fluoro;

$R^7$ is hydrogen, lower alkyl, cycloalkyl, aryl, aralkyl, lower alkylthiaalkyl, lower alkoxyalkyl, halogen substituted lower alkyl, heterocyclic or a metal cation;

$R^{15}$ is hydrogen, lower alkyl, cycloalkyl, aryl or aralkyl;

$R^{16}$ is hydrogen, lower alkyl, cycloakyl, aryl or aralkyl or carboxylic acyl;

$R^{17}$ is lower alkyl, cycloalkyl, aryl or aralkyl; and each of $R^8$ and $R^9$ is hydrogen, alkyl, alkenyl, cycloalkyl, hydroxyalkyl, alkoxyalkyl, aryl or aralkyl, or when taken together with the nitrogen atom to which they are attached, pyrrolidino, morpholino, piperazino or 4-alkylpiperazino.

The compounds of Formula A are useful for the control of insects. The utility of these compounds as insect control agents is believed to be attributable to their juvenile hormone activity. They are preferably applied to the immature insect, namely—during the embryo, larvae or pupae stage in view of their effect on metamorphosis and otherwise cause abnormal development leading to death or inability to reproduce. These compounds are effective control agents for Hemipteran such as Lygaeidae, Miridae and Pyrrhocoridae; Lepidopteran such as Pyralidae, Noctuidae and Gelechiidae; Coleopteran such as Tenebrionidae, Crysomelidae and Dermestidae; Dipteran such as mosquitos, flies; Homopteran such as "aphids" and other insects. The compounds can be applied at low dosage levels of the order of 0.001 μg. to 25.0 μg. per insect. Suitable carrier substances include liquid or solid carriers, such as water, acetone, xylene, mineral or vegetable oils, talc, vermiculite, natural and synthetic resins and silica. Treatment of insects in accordance with the present invention is accomplished by spraying, dusting or exposing the insects to the vapor of the compounds of Formula A. Generally, a concentration of less than 25% of the active compound is employed. The formulations can include insect attractants, emulsifying agents or wetting agents to assist in the application and effectiveness of the active ingredient. In the application of the compounds, there is generally employed a mixture of the C–2,3 trans and cis isomers.

In another embodiment of the present invention, there is provided compounds of the following Formula B which are useful for the control of insects in the same manner as the diolefinic compounds of Formula A and which also serve as precursors for the preparation of the compounds of Formula A.

$$R^4-\overset{R^3}{\underset{}{C}}=\overset{R^{14}}{\underset{}{C}}-(CH_2)_n-CH_2-\overset{R^2}{\underset{}{C}}H-(CH_2)_m-C=\overset{R^{13}}{\underset{}{C}}-\overset{R^{12}}{\underset{}{C}}=CH-Q$$

(B)

In Formula B, each of Q, $R^1$, $R^{12}$, $R^{13}$, $R^2$, $R^{14}$, $R^3$, $R^4$, $m$ and $n$ is the same as defined hereinabove.

In the description hereinafter, each of R–$R^4$, $R^7$–$R^9$, $R^{12}$–$R^{17}$, X, Q, Z, Z', $m$ and $n$ is as defined hereinabove, unless otherwise specified.

As mentioned above, the compounds of Formula B serve as starting materials for the preparation of compounds of Formula A. The compounds of Formula B can be prepared according to the syntheses described below and the examples provided hereinafter.

In one embodiment of the compounds of Formula B, there is provided acids and esters represented by the Formula B′:

$$R^4-\overset{R^3}{\underset{}{C}}=\overset{R^{14}}{\underset{}{C}}-(CH_2)_n-CH_2-\overset{R^2}{\underset{}{C}}H-(CH_2)_m-C=\overset{R^{13}}{\underset{}{C}}-\overset{R^{12}}{\underset{}{C}}=CH-\overset{O}{\underset{}{C}}-OR^7$$

(B′)

One synthesis of esters of Formula B' can be outlined as follows:

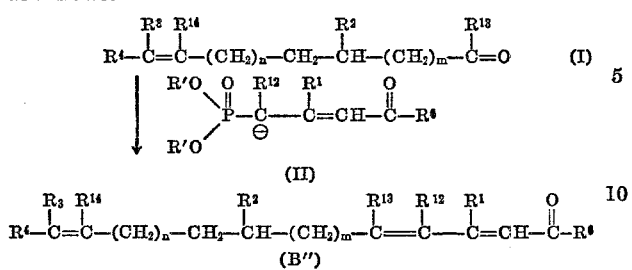

In the above formulas, R' is lower alkyl, cycloalkyl, benzyl or phenyl and $R^6$ is lower alkoxy, cycloalkoxy or aralkoxy.

In the above synthesis, a carbonyl of Formula I is reacted with a carbanion of Formula II to yield an ester of Formula B''.

The carbanion (II) is generated by treatment of the corresponding phosphonate with a base such as an alkali hydroxide, alkali hydride or alkali alkoxide, e.g. NaOH, NaH, sodium ethoxide or sodium methoxide, in an organic solvent inert to the reaction such as hydrocarbon, ether or dialkylsulfoxide solvent e.g., benzene, toluene, dimethylformamide or tetrahydrofuran. The reaction is generally conducted at a temperature of from about −20° C. to room temperature or above. The reaction of the carbanion with the carbonyl (I) is generally conducted at temperature of about 0° C. to room temperature or above. The phosphonates can be prepared as described by Pattenden and Weedon, J. Chem. Soc. (C), 1984 and 1997 (1968), Stilz and Pommer, U.S. Pats. 3,163,669 and 3,177,226 and Corey et al., Tetrahedron Letters No. 2, 1821 (1971).

A second synthesis of esters of Formula B is outlined as follows:

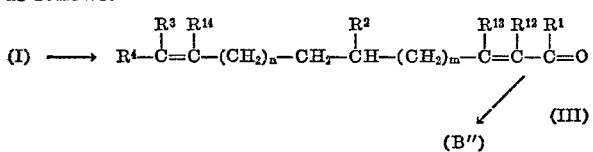

In the second synthesis outlined above of I to III to B'', a carbonyl of Formula I is reacted with a carbanion of Formula IIA using the conditions described above or with an ylid of Formula IIB to yield an unsaturated ketone of Formula III

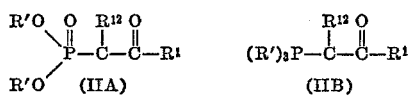

The unsaturated ketone (III) is then reacted with a carbanion of Formula IIC to yield a compound of Formula B'' or by Wittig reaction using the ylid (IID).

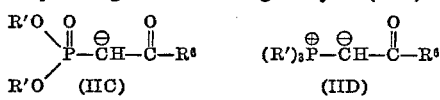

Conversion of III into B using carbanion (IIC) can be done using the same conditions as for conversion of I into III. Wittig reactions are generally done at higher temperatures such as from room temperature to reflux. The ylids are prepared from the corresponding phosphonium bromide or chloride by treatment with a base substance such as an alkali metal hydride, alkali metal hydroxide or alkali metal carbonate in an organic solvent, such as toluene, benzene, or tetrahydrofuran, or water or aqueous organic solvent depending upon the particular base. The Wittig reagents can be prepared as described in U.S. Pat. 3,193,565.

A synthesis for esters of Formula B which is applicable when each of $R^{12}$ and $R^{13}$ is hydrogen is outlined as follows:

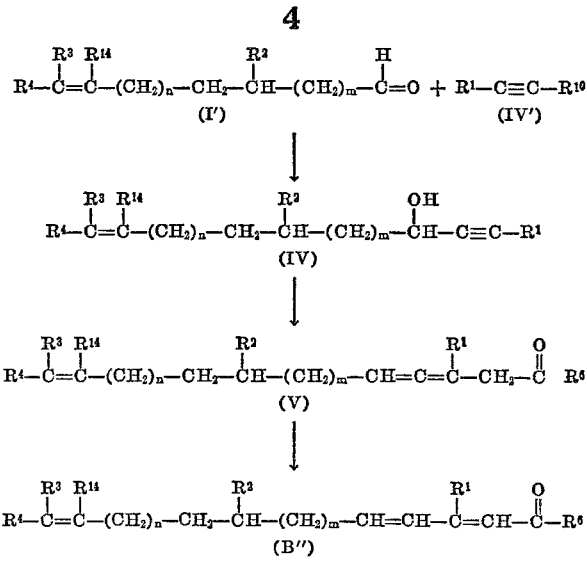

$R^{10}$ is a metal such as lithium, sodium, potassium or magnesium.

In the third synthesis outlined above, an aldehyde of Formula I' is reacted with an alkyne of Formula IV' to produce the alkynyl alcohol of Formula IV. A compound of Formula IV is then reacted with an orthoester in the presence of weak acid catalyst to yield an allenic ester of Formula V which is rearranged to 2,4-di-unsaturation by treatment with base as described in our copending application Ser. No. 111,768, filed Feb. 1, 1971, now U.S. Pat. 3,716,565. Preparation of alkynyl alcohols is described by Kimel et al., J. Org. Chem. 22 1611 (1957). The conversion of alkynyl alcohols to allenic esters is described by Crandall et al., Chem. Comm., 1411 (1970).

Another synthesis of acids and esters of Formula B' involves base catalyzed condensation wherein an aldehyde such as an aldehyde of Formula I' is reacted with an ester of the formula

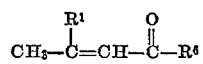

in the presence of an inorganic or organic base. Suitable bases include sodium amide, potassium amide, potassium hydroxide, and the like as described in U.S. Pats. 2,662,-914 and 2,951,853. The novel acids produced by this method are then converted into the desired ester using conventional methods such as preparation of the acid halide followed by reaction with an alcohol.

Another synthesis for acids and esters of Formula B' is the reaction of a ketone of Formula III hereinabove with ketene to form the acid (B'; $R^7$ is hydrogen) which can be subjected to esterification prior to isolation of the acid, if desired, with an alcohol such as methanol, ethanol or isopropanol according to the ester moiety desired. In the practice of this synthesis, gaseous ketene is passed through an excess of the ketone (III) containing a catalytic amount of an acid catalyst. The ketene can be diluted with an organic solvent inert to the reaction if desired. Suitable conditions and catalysts for the practice of this synthesis is described by Boese, Jr., U.S. Pat. 2,382,-464.

The esters of Formula B' and B'' are converted into the corresponding acid by hydrolysis with base such as potassium carbonate, sodium carbonate, sodium hydroxide, and the like in organic solvent such as methanol or ethanol. Other esters of the present invention can be prepared by transesterification or conversion of the acid into the acid halide by treatment with thionyl chloride, oxalyl chloride, phosphorous pentabromide or the like, and then reacting the acid halide with the alcohol corresponding to the ester moiety desired. Acyl fluorides (X is fluoro) are prepared by reacting the acyl bromide or acyl chloride with one mole anhydrous hydrogen fluoride under dry conditions and at low temperature such as about −5° C. for a few minutes.

In a second embodiment of the novel compounds of the present invention, there is provided thio-acids and thiol esters of Formula B. Thio-acids and thiol esters

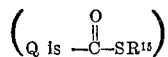

can be prepared from the respective acid halide using hydrogen sulfide to prepare the thio-acid and a thiol $R^{15}$-SH in pyridine or a mercaptide to prepare the thiol ester. Thiol esters can be prepared by alkylation of the sodium salt of a thio-acid of the present invention also. See U.S. Pats. 3,567,747 and 3,505,366.

In another embodiment of the present invention, there is provided ketones and aldehydes of Formula B. The ketones of Formula B, Q is

wherein $R^{15}$ is not hydrogen can be prepared by treatment of an ester of Formula B′ or an acid of Formula B′ ($R^7$ is hydrogen) with the appropriate organo-lithium, the organo group corresponding to the ketone moiety desired. The reaction is generally carried out in an organic solvent such as an ether solvent. In addition, acid halides of Formula B, particularly the acid chloride, can be used for the preparation of ketones of Formula B by reaction with lithium diorganocopper, e.g. lithium dimethylcopper, using the procedure of Posner and Whitten, Tetrahedron Letters, No. 53, 4647 (1970).

The aldehydes of Formula A can be prepared by the controlled oxidation of an allylic alcohol of Formula B using chromic acid, manganese dioxide, and the like. The oxidation can be carried out using procedures described by Burrell et al., J. Chem. Soc. (C), 2144 (1966); Weedon et al., J. Chem. Soc. 2687 (1951) and Helv. Chim. Acta 32 1356 (1949). The allylic alcohols of Formula B are prepared by reduction of the corresponding ester or acid of Formula B′ using lithium aluminum hydride or the like. The overall conversion can be outlined as follows using partial formulas for brevity:

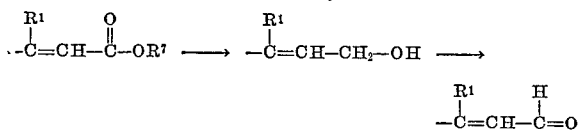

The allylic alcohols of Formula B, i.e. wherein Q is —CH$_2$—OR$^{16}$ in which R$^{16}$ is hydrogen, are prepared by reduction of an ester of Formula B′ or an acid of Formula B′ (R$^7$ is hydrogen). Ethers of Formula B, i.e. wherein Q is —CH$_2$—OR$^{16}$ wherein R$^{16}$ is not hydrogen, are prepared by etherification of an allylic alcohol of Formula B using conventional etherification methods such as by first converting the allylic alcohol into the corresponding halide (Q is —CH$_2$X, in which X is bromo, chloro or iodo) and then reacting the halide with the salt, e.g. the sodium or potassium salt, of an alcohol according to the ether moiety desired. The allylic halides serve as precursors for the preparation of the novel thiols and thioethers of Formula A (Q is —CH$_2$—SR$^{16}$). Thus, reaction of a halide of Formula B with, for example, thiourea or hydrogen sulfide provides the novel thiols. The thioethers can be prepared from the allylic halides by reaction with a mercaptide or by etherification of the thiol.

The sulfinyl compounds of Formula B (Q is —CH$_2$SOR$^{17}$) can be prepared by treatment of a thioether of Formula B (Q is —CH$_2$—SR$^{16}$) with sodium metaperiodate, hydrogen peroxide, or the like, at a temperature of from about 0° to 20° C. for about one hour or less to about six hours. The reaction usually affords some of the sulfonyl compound (Q is —CH$_2$SO$_2$R$^{17}$) of Formula B also which can be separated by chromatography or the like, if desired. By using more than one mole of oxidizer per mole of thioether, higher temperature and/or longer reaction time, the formation of the sulfonyl compounds is favored.

Amines of the present invention can be prepared by reaction of an allylic halide of Formula B with an amine which is outlined as follows using partial formulas.

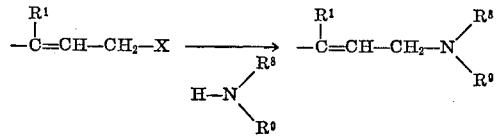

Compounds of the present invention wherein Q is —C≡N can be prepared by reaction of a carbonyl of Formula III with a phosphonacetonitrile of the formula:

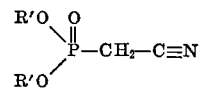

in the presence of base such as an alkali metal hydride or alkali metal alkoxide in an organic solvent such as tetrahydrofuran, benzene, dimethylsulfoxide, toluene, dimethylformamide, ether, and the like. The nitriles of the present invention can be prepared also by treatment of a primary amide of the present invention with sodium borohydride using the procedure of Ellzey Jr. et al., U.S. Pat. 3,493,576. The nitriles of Formula B can be used as precursors for preparation of the amines of the present invention as by treatment with lithium aluminum hydride, and the like to the respective primary amine.

Compounds of the present invention of Formula B wherein Q is

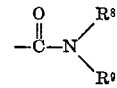

can be prepared by reaction of an acid chloride or acid bromide of Formula B with an appropriate amine selected according to the amido moiety desired. The novel amides of the present invention can be prepared also by the reaction of a carbonyl of Formula I with a carbanion of the formula

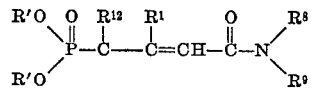

which is generated by treatment of the corresponding phosphonamide with base such alkali metal hydride or alkali metal alkoxide. The amides can be prepared also by reaction of a carbonyl of Formula III with a carbanion or ylid of the following formulas, respectively:

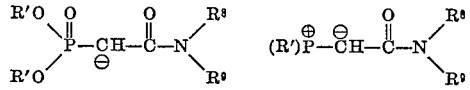

Another method of preparation of the amides of the present invention is the reaction of an alkynyl alcohol of Formula IV with an amide ketal to afford an allenic amide of the formula

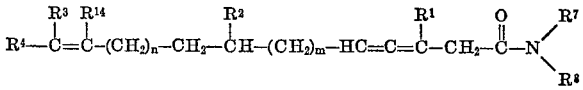

which is rearranged to 2,4-diene under basic conditions.

Another method for the preparation of amides is base catalyzed condensation of an aldehyde, such as aldehyde of Formula I′, with an amide of the formula:

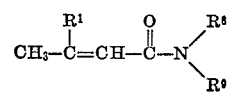

in the presence of an inorganic or organic base. Suitable bases are described in U.S. Pats. 2,662,914 and 2,951,853.

Synthesis of aldehydes and ketones of Formula I can be accomplished using methods known in the art. Many of the carbonyl precursors of Formula I are commercially available. The aldehydes of Formula I can be prepared, for example, by oxidation, of the corresponding primary alcohol using chromic acid, manganese dioxide, or the like.

Compounds of Formula I wherein $m$ is one, two or three can be prepared utilizing carbonyl precursors as outlined below:

$$R^4-\overset{R^3}{\underset{|}{C}}=\overset{R^{14}}{\underset{|}{C}}-(CH_2)_n-CH_2-\overset{R^2}{\underset{|}{C}}=O \longrightarrow$$
(X)

$$R^4-\overset{R^3}{\underset{|}{C}}=\overset{R^{14}}{\underset{|}{C}}H-(CH_2)_n-CH_2-\overset{R^2}{\underset{|}{C}}H-(CH_2)_m-\overset{H}{\underset{|}{C}}=O$$
(I')

In the practice of the above synthesis, a carbonyl of Formula X is reacted with a lower alkoxymethyltriphenylphosphonium halide such as methoxymethyltriphenylphosphonium chloride in the presence of alkyllithium, aryl lithium or the like followed by treatment with acid to afford an aldehyde of Formula I' wherein $m$ is zero. Suitable conditions for this reaction are described by Nelson, U.S. Pat. 3,562,336. By repeating this reaction using the thus-prepared aldehyde as the starting material, an aldehyde of Formula I' wherein $m$ is one is prepared. Aldehydes of Formula I' wherein $m$ is two and three are prepared by simply repeating the foregoing reaction using the appropriate precursor of Formula I' wherein $m$ is one and two, respectively.

Compounds of Formula I wherein $R^{13}$ is lower alkyl can be prepared by reaction of an aldehyde of Formula I'; with a Grignard $R^{13}MgX$ ($R^{13} \neq H$) following by oxidation.

I' $\longrightarrow$ $$R^4-\overset{R^3}{\underset{|}{C}}=\overset{R^{14}}{\underset{|}{C}}-(CH_2)_n-CH_2-\overset{R^2}{\underset{|}{C}}H-(CH_2)_m-\overset{R^{13}}{\underset{\underset{H}{|}}{\overset{|}{C}}}-OH \longrightarrow I(R^{13}\neq H)$$

Ketones of Formula X can be prepared according to methods described in the literature. A general procedure for compounds of Formula X, in which $n$ is one, two or three, can be outlined as follows ($\phi$ is phenyl and $n'$ is two, three or four):

$$R^4-\overset{R^3}{\underset{|}{C}}=O \xrightarrow[(2)\ H+]{(1)\ \phi_3P-\overset{R^{14}}{\underset{\overset{|}{\ominus}}{\overset{|}{C}}}-(CH_2)_{n'}-\overset{O\diagdown\diagup O}{\underset{|}{C}}-R^2} R^4-\overset{R^3}{\underset{|}{C}}=\overset{R^{14}}{\underset{|}{C}}-(CH_2)_{n'}-\overset{R^2}{\underset{|}{C}}=O$$
(XI)  (XII)

In the above process, a ketone of Formula XI is reacted with the phosphonium ylid in the presence of alkyl lithium or phenyl lithium to yield the ketal of XII, which is treated with aqueous acid to yield the carbonyl XII. The ylid (1) is prepared from the chloride:

$$R^2C-(CH_2)_{n'}-\overset{R^{14}}{\underset{|}{C}}H-Cl$$

Suitable procedures for the preparation of the ylid and Wittig reactions are described by A. W. Johnson, "Ylid Chemistry," Academic Press Inc. New York (1966), U.S. Pats. 3,078,256 and 3,130,219, Canadian Pat. 834,191, and Chem. Com. 733, July 1969.

A general method for the preparation of precursors of Formula I and XIII, particularly wherein $n$ is zero or one, is the reaction of an allyl alcohol with an enol ether. See also U.S. Pats., 2,841,620, 2,849,491, 2,902,510, 2,902,-515, 3,428,694, 3,493,619 and 3,574,715. A good review of the preparation of aldehydes is provided by Burgstahler, J. Org. Chem. 28 (10), 2918 (1963); Johnson et al., J. Chem. Soc., 520 (1964); Naves, Chim. Ind. (Paris), 94 (3), 223 (1965); and Carnduff, Quart. Rev. (London) 20 (2), 169 (1966).

Examples of carbonyl compounds included within Formulas I and I' useful for the preparation of compounds of Formula B are the following.

citronellal
3,7-dimethylnon-6-en-1-al
3-methyloct-6-en-1-al
3-methyl-7-ethylnon-6-en-1-al
3-ethyl-7-methylnon-6-en-1-al
3,7-diethylnon-6-en-1-al
3,6,7-trimethyloct-6-en-1-al
3,6,7-trimethylnon-6-en-1-al
3,7,8-trimethylnon-6-en-1-al
3,7-dimethyldec-6-en-1-al
3,7-dimethylundec-6-en-1-al
2,4,5-trimethylhex-4-en-1-al
2,4,5-trimethylhept-4-en-1-al
3,5,6-trimethylhept-5-en-1-al
3,5,6-trimethyloct-5-en-1-al
3,6-dimethylhept-5-en-1-al
3,6-dimethyloct-5-en-1-al
2,6-dimethylhept-5-en-1-al
2,5,6-trimethylhept-5-en-1-al
2,6-dimethyloct-5-en-1-al
4,7,8-trimethylnon-7-en-1-al
4,8-dimethylnon-7-en-1-al
4,8-dimethyldec-7-en-1-al
3,8-dimethylnon-7-en-1-al
3,8-dimethyldec-7-en-1-al
3,7,8-trimethyldec-7-en-1-al
4,9-dimethyldec-8-en-1-al
3,9-dimethyldec-8-en-1-al
2,9-dimethyldec-8-en-1-al The compounds of Formula A wherein Z' is hydrogen and Z is halo can be prepared by treating a compound of Formula B with hydrogen halide in carbon tetrachloride or other halogenated hydrocarbon solvents of low dielectric constant. The compounds of Formula A wherein Z' is halo can be prepared by treating a compound of Formula B with bromine, chlorine or fluorine in a halogenated hydrocarbon solvent.

The compounds of Formula A wherein Z' is hydrogen and Z is the group —OR in which R is hydrogen can be prepared by the addition of water to the terminal olefinic bond of a compound of Formula B using a mercuric salt followed by reduction of the oxymercurial intermediate in situ. Suitable mercuric salts include mercuric acetate, mercuric nitrate, mercuric trifluoroacetate, mercuric acrylates and mercuric halides. Suitable reducing agents include the borohydrides, hydrazine and sodium amalgam. See Brown and Rei, J. Am. Chem. Soc. 91, 5646 (1969); Brown et al., J. Am. Chem. Soc. 89, 1522 and 1524 (1967); and Wakabayashi, J. Med. Chem. 12, 191 (January, 1969). By conducting the reaction in the presence of an alcohol (R—OH) such as methanol, ethanol, isopropyl alcohol, benzyl alcohol, cyclopentanol, and the like, the corresponding ether is prepared. The compounds of Formula A wherein Z is —OR in which R is carboxylic acyl and Z' is hydrogen can be prepared from a compound of Formula A wherein Z is —OH and Z' is hydrogen by reaction with a carboxylic acid chloride or bromide or carboxylic acid anhydride in pyridine or by treatment with a carboxylic acid anhydride in the presence of sodium acetate. The reaction is generally conducted at about room temperature to reflux temperature for about one to forty-eight hours, shorter reaction time being favored by temperatures above room temperature.

In another embodiment of the present invention, compounds of Formula A are prepared by first introducing the substituents Z and Z' on a carbonyl of Formula I or III and thereafter perform introduction of the group Q. The substituents Z and Z' are introduced using the procedure described above to prepare the substituted carbonyl XIII

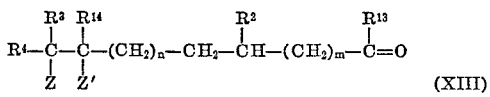

(XIII)

which is reacted with the carbanion IIA or ylid IIB to prepare the unsaturated ketone (XIV)

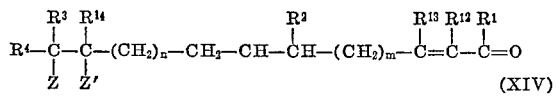

(XIV)

A compound of Formula XIV is reacted with a dialkyl phosphonacetonitrile in the presence of base, such as an alkali metal hydride or alkali metal alkoxide, in an organic solvent, such as a hydrocarbon, ether or dialkylsulfoxide, e.g. tetrahydrofuran, benzene, dimethylsulfoxide, toluene, dimethylformamide, and the like, to prepare the novel nitriles of Formula A (Q is —C≡N)

Reaction of a compound of Formula XIV with a carbanion of Formula IIC or an ylid of Formula IID provides esters of Formula XV

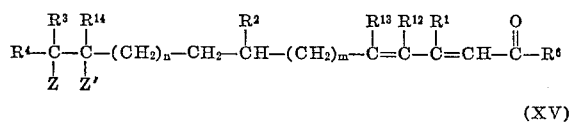

(XV)

which serves as precursors for preparation of other compounds of Formula A such as the acids, acid halides, other esters, thiolesters, di-unsaturated ketones and aldehydes, allylic alcohols, ethers, thiols, thioethers, sulfides, sulfones, allylic halides, amines and amides using procedures described herein for the preparation of compounds of Formula B.

Esters of Formula XV can be prepared also by reaction of a carbanion of Formula II with a carbonyl of Formula XIII. Amides of Formula A can be prepared also by reaction of a carbonyl of Formula XIII with a carbanion of the formula

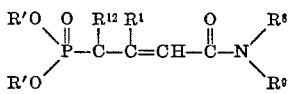

or by reaction of a ketone of Formula XIV with a carbanion or ylid of the formula

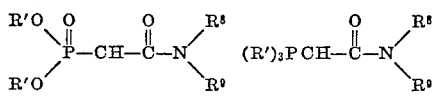

In addition to the methods described herein above for preparation of the precursors of Formula XIII, the procedure of U.S. Pats. 2,902,495 and 3,060,237 and French Pat. 1,403,943. (CA 63:16394) can be used.

The term "cycloalkyl," as used herein, refers to a cyclic alkyl group of four to eight carbon atoms. The term "aralkyl" refers to a monovalent hydrocarbon group in which an aryl group is substituted for a hydrogen atom of an alkyl group, such as benzyl, xylyl, mesityl, phenylethyl, methylbenzyl, naphthylmethyl and naphthylethyl containing up to twelve carbon atoms. The term "aryl," as used herein, refers to an aromatic group of up to twelve carbon atoms. Typical aromatic groups include phenyl, naphthyl, lower alkylphenyl such as methylphenyl, ethylphenyl, t-butylphenyl and isopropylphenyl, lower alkylthiophenyl such as methylthiophenyl, ethylthiophenyl and isopropylthiophenyl, lower alkoxyphenyl such as methoxyphenyl and ethoxyphenyl, halophenyl such as chlorophenyl, bromophenyl, iodophenyl and fluorophenyl, nitrophenyl, methylenedioxyphenyl, lower alkenylphenyl such as vinylphenyl and allylphenyl, phenylketones such as acetophenone, benzoic esters such as lower alkyl benzoate and benzamides such N-lower alkyl benzamide and N,N-di(lower alkyl) benzamide. In the case of substituted phenyl, the substituent such as lower alkyl, lower alkylthio, lower alkoxy, halo, nitro, lower alkenyl, carbonyl, lower alkoxycarbonyl, cyano, and amido can be in one or more positions of the phenyl ring, usually in the para position. The term "heterocyclic," as used herein, refers to a heterocyclic group consisting of four or five carbon atoms and one heteroatom which is oxygen, nitrogen or sulfur such as the heterocyclics pyridine, pyran, thiophan, pyrole, furan and thiophen.

The term "hydroxyalkyl," as used herein, refers to an alkyl group substituted with one hydroxy group, e.g. hydroxymethyl, p-hydroxyethyl and 4-hydroxypentyl. The term "alkoxyalkyl," as used herein, refers to an alkyl group substituted with one alkoxy group, e.g. methoxymethyl, 2-methoxyethyl, 4-ethoxybutyl, n-propoxyethyl and t-butoxyethyl. The term "alkenyl," as used herein, refers to an ethylenically unsaturated hydrocarbon group, branched or straight chain, having a chain length of two to twelve carbon atoms, e.g. allyl, vinyl, 3-butenyl, 2-hexenyl and i-propenyl. Whenever any of the foregoing terms are modified by the word "lower," the chain length of the group is not more than six carbon atoms with the exception of lower alkoxyalkyl and lower alkylthiaalkyl in which event a total chain length of twelve carbon atoms is the maximum. The term "halogen substituted lower alkyl," as used herein refers to a lower alkyl group substituted with one to three halogen atoms such as chloromethyl, fluoromethyl, 1,1,1-trifluoroethy, 2,2,2-trichloroethyl and the like.

The term "carboxylic acyl," as used herein, refers to the acyl group of a carboxylic acid, anhydride or halide. The acyl group is determined by the particular carboxylic acid halide or carboxylic acid anhydride employed in the esterification. Although no upper limitation need be placed on the number of carbon atoms contained in the acyl group within the scope of the present invention, generally it contains from one to eighteen carbon atoms. Typical esters of the present invention include formate, acetate, propionate, enanthate, benzoate, trimethylacetate, trichloroacetate, trifluoroacetate, t-butylacetate, phenoxyacetate, cyclopentylpropionate, aminoacetate, β-chloropropionate, adamantoate, octadec-9-enoate, dichloroacetate, butyrate, pentanoate, hexanoate, phenylacetate, p-methylbenzoate, β-phenylpropionate, 3,4-dimethylbenzoate, p-isopropylbenzoate, cyclohexylacetate, stearate, methacrylate, p-chloromethylbenzoate, p-methoxybenzoate and p-nitrobenzoate.

The term "metal" as used herein, refers to lithium, sodium, potassium, calcium, strontium, copper, manganese and zinc. The term "alkyl" refers to a branched or straight chain, saturated aliphatic hydrocarbon of one to twelve carbon atoms. The term "lower alkyl" refers to an alkyl group having a chain length of one to six carbon atoms.

In addition to the compounds of the present invention having activity useful for the control of insects, the compounds of Formulas A and B have numerous other useful applications. For example, the esters of Formula B' of the present invention are useful lubricants and plasticizers for polymers such as SBR, polybutadiene, ethylene-propylene copolymers and polypropylene and aid in the processing and application of polymers. The aldehydes and ketones of Formulas A and B

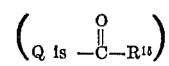

are useful in perfumery compositions in view of their odor-imparting properties. Thiolesters of Formulas A and B possess excellent lubricating properties per se and are also useful as lubricant additives. The amides of Formulas A and B are useful as anti-static agents for synthetic and natural fibers. The amides can be incorporated into the fiber material by blending prior to extrusion or by application to the fiber after extrusion. The amines of Formulas A and B are useful wetting and cleansing agents per se for textiles and as intermediates therefor using the method of U.S. Pat. 2,169,976.

The presence of an olefinic bond at positions C-2 and C-4 of the compounds of Formula A gives rise to four isomers, each of which is embraced by the present invention. The presence of three olefinic bonds in compounds of Formula B give rise to eight isomers, each of which is embraced by the present invention. As mentioned above, a mixture of isomers is suitably employed for the control of insects such as a mixture containing the trans (2), trans (4) isomer and the cis (2), trans (4) isomer. The conditions of the syntheses described herein and the reactants can be selected so as to favor formation of one isomer such as the all trans isomer over the formation of other isomers. The selection of appropriate conditions and reactants to favor formation of one isomer over another will be apparent to those of ordinary skill in the art giving due consideration to the specific examples hereinafter. See also Pattenden and Weedon, supra and Corey et al., supra. In the specific examples hereinafter, when isomerism is not specified, it is understood to include a mixture of isomers which, if desired, can be separated using known separation methods. Hereafter, when only one designation of configuration is given, the designation refers to position C-2,3 and the configuration is taken to be trans at position C-4,5 when not otherwise specified. The use of "trans/cis" and "cis/trans" is with reference to position C-2,3 and indicates a mixture of isomers.

The following examples are provided to illustrate the practice of the present invention. Temperature is given in degrees centigrade.

EXAMPLE 1

To a mixture of one g. of 3,7-dimethyloct-6-en-1-al 1.5 g. of phosphonate (II; R' is ethyl, $R^1$ is methyl, $R^6$ is ethoxy, $R^{12}$ is hydrogen) and 50 ml. of dimethylformamide, under nitrogen, is slowly added sodium ethoxide (prepared from 200 mg. of sodium and 12 ml. of ethanol). The mixture is allowed to stand at room temperature for one hour and then is worked up with ether. The ethereal extracts are dried, concentrated and then chromatographed on silica plates eluting with hexane/ether to yield ethyl 3,7,11-trimethyldodeca-2,4,10-trienoate which is predominantly trans at position C-2,3 and C-4,5.

By using diethyl 3-methoxycarbonyl-2-methylprop-2-enyl phosphonate and sodium methoxide, there is prepared methyl 3,7,11-trimethyldodeca-2,4,10-trienoate.

EXAMPLE 2

The process of Example 1 is repeated using each of the aldehydes under Column I as the starting material to yield the respective ester under Column II

I 3,7-dimethylnon-6-en-1-al
3-ethyl-7-methylnon-6-en-1-al
3,7-diethylnon-6-en-1-al
4,8-dimethylnon-7-en-1-al
3,6-dimethylhept-5-en-1-al
3,6-dimethyloct-5-en-1-al
2,6-dimethylhept-5-en-1-al

II ethyl 3,7,11-trimethyltrideca-2,4,10-trienoate
ethyl 3,11-dimethyl-7-ethyltrideca-2,4,10-trienoate
ethyl 7,11-diethyl-3-methyltrideca 2,4,10-trienoate
ethyl 3,8,12-trimethyltrideca-2,4,11-trienoate
ethyl 3,7,10-trimethylundeca-2,4,9-trienoate
ethyl 3,7,10-trimethyldodeca-2,4,9-trienoate
ethyl 3,6,10-trimethylundeca-2,4,9-trienoate

EXAMPLE 3

A mixture of 1 g. of trans/cis methyl 3,7,11-trimethyldodeca-2,4,10-trienoate, 60 ml. of methanol, 0.5 g. of potassium hydroxide and 6 ml. of water is heated at reflux for about 8 hours. The mixture is then diluted with water, neutralized and extracted with ether. The organic phase is washed with water, dried over sodium sulfate and evaporated to yield trans/cis 3,7,11-trimethyldodeca-2,4,10-trienoic acid.

Using the foregoing procedure, the other esters of Example 2 are hydrolyzed to produce the respective free acids under Column III.

III 3,7,11-trimethyltrideca-2,4-10-trienoic acid
3,11-dimethyl-7-ethyltrideca-2,4,10-trienoic acid
7,11-diethyl-3-methyltrideca-2,4,10-trienoic acid
3,8,12-trimethyltrideca-2,4,11-trienoic acid
3,7,10-trimethylundeca-2,4,9-trienoic acid
3,7,10-trimethyldodeca-2,4,9-trienoic acid
3,6,10-trimethylundeca-2,4,9-trienoic acid

EXAMPLE 4

One gram of thionyl chloride is added with stirring at room temperature to 0.5 g. of trans/cis 3,7,11-trimethyldodeca-2,4,10-trienoic acid and the mixture heated at about 50° for 10 minutes. Excess thionyl chloride is removed by evaporation and then t-butyl alcohol (about 2 equivalents) is added and the mixture heated at about 50° for about five minutes to yield t-butyl 3,7,11-trimethyldodeca-2,4,10-trienoate (trans/cis).

By using other alcohols in place of t-butyl alcohol in the process of this example, such as cyclohexyl alcohol, isopropyl alcohol, benzyl alcohol, n-pentanol, n-hexanol, or n-propanol, the respective esters are prepared, i.e., cyclohexyl 3,7,11-trimethyldodeca-2,4,10-trienoate
isopropyl 3,7,11-trimethyldodeca-2,4,10-trienoate
benzyl 3,7,11-trimethyldodeca-2,4,10-trienoate
n-pentyl 3,7,11-trimethyldodeca-2,4,10-trienoate
n-hexyl 3,7,11-trimethyldodeca-2,4,10-trienoate
n-propyl 3,7,11-trimethyldodeca-2,4,10-trienoate

EXAMPLE 5

To a solution of 0.5 g. of trans/cis 3,7,11-trimethyldodeca-2,4,10-trienoic acid in 15 ml. of benzene is added with stirring an equivalent amount of potassium bicarbonate. The mixture is stirred until the evolution of carbon dioxide ceases and then evaporated to yield potassium 3,7,11-trimethyldodeca-2,4,10-trienoate.

Alternatively, acid salts can be prepared by titrating the acid with an organic solution or aqueous organic solution of the desired metal.

EXAMPLE 6

One gram of 3,7,11-trimethyltrideca-2,4,10-trienoic acid in 30 ml. of benzene and one mol of sodium hydride is stirred about two hours and then a slight excess of oxalyl chloride is added at about 0° and stirred for one hour. The product is worked up by removal of solvent in vacuo and extraction with pentane to yield 3,7,11-trimethyltrideca-2,4,10-trienoyl chloride.

EXAMPLE 7

(A) To magnesium propynylide (15 g.) in 150 ml. of ether is slowly added 0.3 moles of 3,7-dimethyloct-6-en-1-al and the mixture then stirred overnight. Saturated aqueous ammonium chloride is added and the layers separated. The organic phase, combined with ether backwashings of aqueous phase, is washed with water, dried and solvent evaporated to yield 6,10-dimethyl-9-undecen-2-yn-4-ol which can be purified by chromatography.

(B) A mixture of 18.5 g. of the alkynyl alcohol of part A, 80 g. of triethylorthoacetate and 0.7 g. of propionic acid is refluxed under a spinning band column to remove ethanol as it is formed. After the elimination of ethanol is about complete, the crude reaction product is distilled under vacuum to yield ethyl 3,7,11-trimethyldodeca-3,4,10-trienoate. Alternatively, the crude reaction product is purified by chromotography on silica.

(C) A solution of 1.0 g. of the allenic ester of part B in 20 ml. of ethanol is treated with 4 ml. of aqueous 2 N sodium hydroxide and left at room temperature for several minutes. The mixture is then poured into pentane and washed with saturated brine and separated. Evaporation of the organic phase yields ethyl 3,7,11-trimethyl-dodeca-2,4,10-trienoate.

EXAMPLE 8

The process of Example 7, part A, is repeated using each of the aldehydes under Column I as the starting material to yield the respective alkynyl alcohol under Column IV, each of which is reacted with triethylorthoacetate using the process of Example 7, part B, to prepare the respective allenic ester under Column V.

IV 6,10-dimethyl-9-dodecen-2-yn-4-ol
6-methyl10-ethyl-9-dodecen-2-2-yn-4-ol
6,10-diethyl-9-dodecen-2-yn-4-ol
7,11-dimethyl-10-dodecen-2-yn-4-ol
6,9-dimethyl-8-decen-2-yn-4-ol
6,9-dimethyl-8-undecen-yn-4-ol
5,9dimethyl-8-decen-2-yn-4-ol

V ethyl 3,7,11-trimethyltrideca-3,4,10-trienoate
ethyl 3,11-dimethyl-7-ethyltrideca-3,4,10-trienoate
ethyl 3-methyl-7,11-diethyltrideca-3,4,19-trienoate
ethyl 3,8,12-trimethyltrideca-3,4,11-trienoate
ethyl 3,7,10-trimethylundeca-3,4,9-trienoate
ethyl 3,7,10-trimethyldodeca-3,4,9-trienoate
ethyl 3,6,10-trimethylundeca-3,4,9-trienoate Using the process of Example 7, part C, each of the allenic esters under Column V is rearranged by treatment with aqueous sodium hydroxide to produce the respective α,β-unsaturated ester.

EXAMPLE 9

To 126 mg. of a 57% dispersion of sodium hydride in oil is added pentane. The pentane is removed and the sodium hydride washed several times with pentane. To the washed sodium hydride is added 582 mg. of diethyl acetyl-methylphosphonate (IIA; R' is ethyl, $R^1$ is methyl, $R^{12}$ is hydrogen) in 5 ml. of tetrahydrofuran at $-10°$ under argon. After several minutes, the solution is transferred to a solution of 425 mg. of 3,7-dimethyloct-6-en-1-al in about 4 ml. of dry tetrahydrofuran under argon over a period of about 20 minutes at room temperature. After about two hours, water is added followed by addition of ether and the layers separated. The organic layer is washed with saturated sodium chloride, dried over sodium sulfate and evaporated under reduced pressure to yield 6,10-dimethylundeca-3,9-dien-2-one.

EXAMPLE 10

One gram of triphenylphosphineacetylmethylene and 425 mg. of 3,7-dimethylnon-6-en-1-al are dissolved in 10 ml. toluene and refluxed under nitrogen overnight. The toluene is distilled off and the formed triphenylphosphine oxide crystallized by addition of pentane. Filtration and evaporation of the pentane gives a residue, which is further purified by preparative thin layer chromatography to yield 6,10-dimethyldodeca-3,9-dien-2-one.

EXAMPLE 11

41 grams of 3,7-dimethyloct-6-en-1-al and 80 g. of recrystallized (ethyl acetate) triphenylphosphineacetylmethylene [Ramirez et al., J. Org. Chem. 22, 41 (1957)] are refluxed in one liter of dry toluene for 18 hours, under nitrogen. Most of the solvent is removed in vacuo, 500 ml. pentane is added and the mixture filtered. The flask and the triphenylphosphine oxide filter cake are washed several times with pentane. The filtrate is concentrated under vacuum to yield 6,10-dimethylundeca-3,9-dien-2-one.

EXAMPLE 12

Using the process of either of Example 9, 10 or 11, each of the aldehydes under Column I is converted into the respective di-unsaturated ketone under Column VI.

VI 6,10-dimethyldodeca-3,9-dien-2-one
6-methyl-10-ethyldodeca-3,9-dien-2-one
6,10-diethyldodeca-3,9-dien-2-one
7,11-dimethyldodeca-3,10-dien-2-one
6,9-dimethyldeca-3,8-dien-2-one
6,9-dimethylundeca-3,8-dien-2-one
5,9-dimethyldeca-3,8-dien-2-one.

EXAMPLE 13

The carbanion of diethyl carbomethoxymethyl phosphonate is reacted with 6,10-dimethylundeca-3,9-dien-2-one and each of the ketones under column VI using the procedure of either Example 1 or 9 to prepare the respective methyl esters under Column VII.

VII methyl 3,7,11-trimethyldodeca-2,4,10-trienoate
methyl 3,7,11-trimethyltrideca-2,4,10-trienoate
methyl 3,11-dimethyl-7-ethyltrideca-2,4,10-trienoate
methyl 3-methyl-7,11-diethyltrideca-2,4,10-trienoate
methyl 3,8,12-trimethyltrideca-2,4,11-trienoate
methyl 3,7,10-trimethylundeca-2,4,9-trienoate
methyl 3,7,10-trimethyldodeca-2,4,9-trienoate
methyl 3,6,10-trimethylundeca-2,4,9-trienoate

EXAMPLE 14

Anhydrous hydrogen chloride is bubbled into 100 ml. of dry carbon tetrachloride at 0° until one equivalent is taken up. Five grams of trans ethyl 3,7,11-trimethyldodeca-2,4,10-trienoate is added and the resulting mixture allowed to stand for about 48 hours at 0°. The mixture is evaporated under reduced pressure to yield trans ethyl 11-chloro-3,7,11-trimethyldodeca - 2,4 - dienoate which is purified by chromatography.

The above process is repeated using each of the unsaturated esters under Column II to prepare the respective compound under Column VIII.

VIII ethyl 11-chloro-3,7,11-trimethyltrideca-2,4-dienoate,
ethyl 11-chloro-3,11-dimethyl-7-ethyltrideca-2,4-dienoate,
ethyl 11-chloro-7,11-diethyl-3-methyltrideca-2,4-dienoate,
ethyl 11-chloro-3,8,12-trimethyltrideca-2,4-dienoate,
ethyl 10-chloro-3,7,10-trimethylundeca-2,4-dienoate.
ethyl 10-chloro-3,7,10-trimethyldodeca-2,4-dienoate.
ethyl 10-chloro-3,6,10-trimethylundeca-2,4-dienoate.

Each of the esters under Col. VII is used as the starting material in the process of this example to prepare the hydrochlorides under Col. IX.

IX methyl 11-chloro-3,7,11-trimethyldodeca-2,4-dienoate,
methyl 11-chloro-3,7,11-trimethyltrideca-2,4-dienoate,
methyl 11-chloro-3,11-dimethyl-7-ethyltridec-2,4-dienoate,
methyl 11-chloro-3-methyl-7,11-diethyltrideca-2,4-dienoate,
methyl 12-chloro-3,8,12-trimethyltrideca-2,4-dienoate,
methyl 10-chloro-3,7,10-trimethylundeca-2,4-dienoate,
methyl 10-chloro-3,7,10-trimethyldodeca-2,4-dienoate, and
methyl 10-chloro-3,6,10-trimethylundeca-2,4-dienoate.

EXAMPLE 15

Each of benzyl 3,7,11-trimethyltrideca-2,4,10-trienoate, isopropyl 3,7,11-trimethyldodeca-2,4,10-trienoate, cyclohexyl 3,7,11-trimethyldodeca-2,4,10-trienoate and n-hexyl 3,7,10-trimethylundeca-2,4,9-trienoate is used as the starting material in the procedure of Example 14 to prepare the respective compound, that is— benzyl 11-chloro-3,7,11-trimethyltrideca-2,4-dienoate,
isopropyl 11-chloro-3,7,11-trimethyldodeca-2,4-dienoate,
cyclohexyl 11-chloro-3,7,11-trimethyldodeca-2,4-dienoate, and
n-hexyl 10-chloro-3,7,10-trimethylundeca-2,4-dienoate.

EXAMPLE 16

One gram of trans ethyl 3,7,11-trimethyldodeca-2,4,10-trienoate is added to a solution of 1 equiv. of dry hydrogenfluoride in dry tetrahydrofuran. The mixture is allowed to stand at 0° for 15 hours and is then washed with water, dried and evaporated under reduced pressure to yield trans ethyl 11-fluoro-3,7,11-trimethyldodeca-2,4-dienoate which can be purified by chromatography.

EXAMPLE 17

The process of Example 14 is repeated with the exception of using dry hydrogen bromide in place of hydrogen chloride to yield trans ethyl 11-bromo-3,7,11-trimethyldodeca-2,4-dienoate.

By treating the 11-bromide with anhydrous silver fluoride in acetonitrile under reflux conditions for about six hours, there is prepared trans ethyl 11-fluoro-3,7,11-trimethyldodeca-2,4-dienoate.

EXAMPLE 18

Chlorine gas is bubbled into 200 ml. of carbon tetrachloride at 0° until one equivalent is taken up. Twenty-five grams of trans ethyl 3,7,11-trimethyldodeca-2,4,10-trienoate is added and the mixture is then stirred and then allowed to stand at about 0° for 24 hours. The mixture is then evaporated to yield trans ethyl 10,11-dichloro-3,7,11-trimethyldodeca-2,4-dienoate which can be purified by chromatography.

EXAMPLE 19

To a mixture of 5 g. of trans ethyl 3,7,11-trimethyldodeca-2,4,10-trienoate in 100 ml. of fluorotrichloromethane is slowly added 1 equiv. of dry fluorine in about one hour at about −78°. After stirring the mixture at this temperature for about 16 hours, the resultant mixture is evaporated and chromatographed on silica to yield trans ethyl 10,11-difluoro-3,7,11-trimethyldodeca-2,4-dienoate.

By using bromine in the process of Example 18 there is prepared trans ethyl 10,11-dibromo-3,7,11-trimethyldodeca-2,4-dienoate.

EXAMPLE 20

To a mixture of 1.9 g. of mercuric acetate, 6 ml. of water and 20 ml. of tetrahydrofuran is added 1.49 g. of trans ethyl 3,7,11-trimethyldodeca-2,4,10-trienoate slowly. After addition is complete, the reaction mixture is stirred for about 20 minutes. The mixture is cooled to about 0° and 6 ml. of aqueous sodium hydroxide (3 molar) is added followed by 0.49 g. of sodium borohydride in aqueous sodium hydroxide (about 3 molar). The mixture is stirred for about 30 minutes. The mixture is then decanted, concentrated, diluted with water and then extracted with ether. The etheral extract is washed with water, dried over magnesium sulfate and the product chromatographed on silica to give trans ethyl 11-hydroxy-3,7,11-trimethyldodeca-2,4-dienoate.

The above process is repeated using each of the unsaturated esters under Column II to prepare the respective compound under Column X.

X ethyl 11-hydroxy-3,7,11-trimethyltrideca-2,4-dienoate,
ethyl 11-hydroxy-3,11-dimethyl-7-ethyltrideca-2,4-dienoate,
ethyl 11-hydroxy-7,11-diethyl-3-methyltrideca-2,4-dienoate,

X—Continued ethyl 12-hydroxy-3,8,12-trimethyltrideca-2,4-dienoate,
ethyl 10-hydroxy-3,7,10-trimethylundeca-2,4-dienoate,
ethyl 10-hydroxy-3,7,10-trimethyldodeca-2,4-dienoate, and
ethyl 10-hydroxy-3,6,10-trimethylundeca-2,4-dienoate.

EXAMPLE 21

Each of the esters under Column VII is used as the starting material in the process of Example 20 to prepare the respective hydroxyl under Column XI:

XI methyl 11-hydroxy-3,7,11-trimethyldodeca-2,4-dienoate,
methyl 11-hydroxy-3,7,11-trimethyltrideca-2,4-dienoate,
methyl 11-hydroxy-3,11-dimethyl-7-ethyltrideca-2,4-dienoate,
methyl 11-hydroxy-3-methyl-7,11-diethyltrideca-2,4-dienoate,
methyl 12-hydroxy-3,8,12-trimethyltrideca-2,4-dienoate,
methyl 10-hydroxy-3,7,10-trimethylundeca-2,4-dienoate,
methyl 10-hydroxy-3,7,10-trimethyldodeca-2,4-dienoate, and
methyl 10-hydroxy-3,6,10-trimethylundeca-2,4-dienoate.

EXAMPLE 22

Each of benzyl 3,7,11-trimethyltrideca-2,4,10-trienoate, isopropyl 3,7,11-trimethyldodeca-2,4,10-trienoate, cyclohexyl 3,7,11-trimethyldodeca-2,4,10-trienoate and n-hexyl 3,7,10-trimethylundeca-2,4,9-trienoate is used as the starting material in the process of Example 20 to prepare the respective hydroxy, that is— benzyl 11-hydroxy-3,7,11-trimethyltrideca-2,4-dienoate,
isopropyl 11-hydroxy-3,7,11-trimethyldodeca-2,4-dienoate,
cyclohexyl 11-hydroxy-3,7,11-trimethyldodeca-2,4-dienoate, and
n-hexyl 10-hydroxy-3,7,10-trimethylundeca-2,4-dienoate.

EXAMPLE 23

To a solution of 2 g. of trans ethyl 3,7,11-trimethyldodeca-2,4,10-trienoate in 20 ml. of ethanol, cooled to 0° in an ice bath, is added a suspension of 2.32 g. of mercuric acetate in 50 ml. of ethanol over 15 minutes. The reaction mixture is stirred for two hours and then, with cooling, 1.22 g. of potassium hydroxide in 20 ml. of ethanol is added. Then 0.139 g. of sodium borohydride is added in small portions and stirring continued for 30 minutes. The solution is decanted, then concentrated to half volume, diluted with 100 ml. of water and extracted with ether (3 × 50). The ethereal phase is washed with water, dried over magnesium sulfate and the crude product chromatographed on silica using hexane:ether to yield trans ethyl 11-ethoxy-3,7,11-trimethyldodeca-2,4-dienoate.

EXAMPLE 24

A mixture of 1 g. of trans ethyl 11-hydroxy-3,7,11-trimethyldodeca-2,4-dienoate, 10 ml. of acetic anhydride and 0.5 g. of dry sodium acetate is refluxed for about five hours. After cooling, excess anhydride is removed by vacuum and the residue extracted with ether. The ethereal extract is washed, dried over magnesium sulfate and evaporated to yield the corresponding acetate, trans ethyl 11-acetoxy-3,7,11-trimethyldodeca-2,4-dienoate.

EXAMPLE 25

A mixture of 2 g. of dry trans ethyl 11-hydroxy-3,7,11-trimethyldodeca-2,4-dienoate, 15 ml. of acetyl chloride and 20 ml. of dry pyridine under nitrogen is heated on a steam bath for about six hours. After cooling, the mixture is concentrated under vacuum and the residue taken up in ether. The ethereal extract is washed, dried over magnesium sulfate and evaporated to yield the corresponding acetate, trans ethyl 11-acetoxy-3,7,11-trimethyldodeca-2,4-dienoate.

The process of this example is repeated with the exception of using triethylamine in place of pyridine to yield the 11-acetate.

EXAMPLE 26

One gram of trans ethyl 11-hydroxy-3,7,11-trimethyldodeca-2,4-dienoate in 10 ml. of diglyme is added dropwise to a slurry of 1 g. of sodium hydride in 10 ml. of diglyme under nitrogen. To this mixture is added 0.9 g. of cyclohexylchloride. The reaction mixture is stirred at about 25° for 30 minutes and then quenched in ice water. The organic phase is separated and aqueous phase re-extracted with ether. The organic materials are washed with water, dried over sodium sulfate and evaporated to yield the cyclohexyl ether of trans ethyl 11-hydroxy-3,7,11-trimethyldodeca-2,4-dienoate.

By using each of benzyl chloride and cyclopentyl chloride in the foregoing procedure, the corresponding benzyl ether and cyclopentyl ether is prepared.

EXAMPLE 27

By use of the procedure of Example 25, ethyl 11-hydroxy-3,7-11-trimethyldodeca-2,4-dienoate is converted into the corresponding 11-chloroacetate, 11-dichloroacetate and 11-trichloroacetate using chloroacetyl chloride, dichloroacetyl chloride and trichloroacetyl chloride, respectively.

The respective 11-trifluoroacetate, propionate, n-butanoate, n-pentanoate and n-hexanoate esters of ethyl 11-hydroxy-3,7,11-trimethyldodeca-2,4-dienoate are prepared according to the process of Example 24 using trifluoroacetic anhydride, propionic anhydride, n-butyric anhydride, n-pentanoic anhydride and n-hexanoic anhydride or according to the process of Example 25 using the corresponding acid chloride.

EXAMPLE 28

A mixture of 20 ml. of dry formic acid and 2 g. of trans ethyl 3,7,11-trimethyldodeca-2,4,10-trienoate is heated at 50° for two hours and then poured onto ice cold potassium bicarbonate solution. The reaction is worked up by extraction with ether, washing the ethereal extract, drying over magnesium sulfate and evaporation to yield the formate of trans ethyl 11-hydroxy-3,7,11-trimethyldodeca-2,4-dienoate.

Using the above process, the formates of Formula A are prepared from the corresponding precursor of Formula B having a terminal olefinic bond.

EXAMPLE 29

Fifteen grams of mercuric acetate in 50 ml. of dry ethanol is added to 12 g. of trans ethyl 3,7,11-trimethyldodeca-2,4,10-trienoate in 30 ml. of dry ethanol cooled in an ice bath. The temperature is allowed to come to room temperature by standing overnight. Then the mixture is cooled to 0°, 10 g. of potassium hydroxide in 150 ml. of ethanol is added followed by addition of 1.0 g. of sodium borohydride in small portions. After about 30 minutes at 0°, water is added and mixture left at room temperature for two hours. The mixture is filtered, filtrate concentrated and extracted with ether. The ethereal extract is washed, dried, and evaporated to yield trans ethyl 11-ethoxy-3,7,11-trimethyldodeca-2,4-dienoate which is purified by distillation or chromatography.

By using methanol in the foregoing process in place of ethanol, there is prepared the respective 11-methyl ether. In the same way, each of isopropanol, t-butanol, and n-propanol is added to the terminal double bond to prepare ethyl 11-isopropoxy-3,7,11-trimethyldodeca-2,4-dienoate,
ethyl 11-t-butoxy-3,7,11-trimethyldodeca-2,4-dienoate, and
ethyl 11-n-propoxy-3,7,11-trimethyldodeca-2,4-dienoate

EXAMPLE 30

Each of the tri-unsaturated esters under Col. VII is used as the starting material in the process of Example 21 or 29 to yield the respective ethoxy substituted compound under Col. XII.

XII methyl 11-ethoxy-3,7,11-trimethyldodeca-2,4-dienoate,
methyl 11-ethoxy-3,7,11-trimethyltrideca-2,4-dienoate,
methyl 11-ethoxy-3,11-dimethyl-7-ethyltrideca-2,4-dienoate,
methyl 11-ethoxy-3-methyl-7,11-diethyltrideca-2,4-dienoate,
methyl 12-ethoxy-3,8,12-trimethyltrideca-2,4-dienoate,
methyl 10-ethoxy-3,7,10-trimethylundeca-2,4-dienoate,
methyl 10-ethoxy-3,7,10-trimethyldodeca-2,4-dienoate, and
methyl 10-ethoxy-3,6,10-trimethylundeca-2,4-dienoate.

EXAMPLE 31

A mixture of 1 g. of trans methyl 11-ethoxy-3,7,11-trimethyldodeca-2,4-dienoate, 60 ml. of methanol, 0.5 g. of potassium hydroxide and 6 ml. of water is heated at reflux for about eight hours. The mixture is then diluted with water, neutralized and extracted with ether. The organic phase is washed with water, dried over sodium sulfate and evaporated to yield trans 11-ethoxy-3,7,11-trimethyldodeca-2,4-dienoic acid.

EXAMPLE 32

Using each of the esters under Column II as the starting material in the process of either Example 22 or 29, there is prepared the respective substituted ester under Column XIII.

XIII ethyl-11-ethoxy-3,7,11-trimethyldodeca-2,4-dienoate,
ethyl 11-ethoxy-3,7,11-trimethyltrideca-2,4-dienoate,
ethyl 11-ethoxy-3,11-dimethyl-7-ethyl trideca-2,4-dienoate,
ethyl 11-ethoxy-7,11-diethyl-3-methyltrideca-2,4-dienoate,
ethyl 12-ethoxy-3,8,12-trimethyltrideca-2,4-dienoate,
ethyl 10-ethoxy-3,7,10-trimethylundeca-2,4-dienoate,
ethyl 10-ethoxy-3,7,10-trimethyldodeca-2,4-dienoate, and
ethyl 10-ethoxy-3,6,10-trimethylundeca-2,4-dienoate.

EXAMPLE 33

(A) To a mixture of 50 g. of 7-methoxy-3,7-dimethyl-octan-1-al, 75 g. of diethyl 3-ethoxycarbonyl-2-methyl-prop-2-enyl phosphonate (49% trans), and 500 ml. of dimethylformamide, under nitrogen, at 0°, and with stirring, is slowly added 9 g. of sodium in 250 ml. of ethanol. After addition is complete, the reaction is allowed to continue one hour at room temperature. The reaction is worked up with hexane, filtered through Florisil and filtrate evaporated to yield trans(2), trans(4) and cis(2), trans(4) ethyl 11-methoxy-3,7,11-trimethyldodeca-2,4-dienoate (about 60% trans, trans).

(B) A mixture of 45 g. of the ethyl ester of part A, 350 ml. of ethanol, 100 ml. of water and 70 ml. of 50% aqueous NaOH is refluxed for 22 hours. Ethanol is then removed under reduced pressure, water added followed by extraction with ether. The aqueous phase is adjusted to about pH using aqueous HCl and 31 g. of s-benzyl-isothiouranium hydrochloride in water is added. The thus-formed salt is filtered, washed with water, recrystallized from aqueous methanol (twice) and then treated with aqueous HCl/ether and worked up to yield 11-methoxy-3,7,11-trimethyldodeca-2,4-dienoic acid which crystallizes on cooling.

(C) The acid (0.5 g.) of part B is methylated using diazomethane in ether, followed by chromatography on prep. TLC and distillation (short path) to prepare methyl 11-methoxy-3,7,11-trimethyldodeca-2,4-dienoate (95.2% trans(2), trans(4)). In the same way, using diazoethane is prepared ethyl 11-methoxy-3,7,11-trimethyldodeca-2,4-dienoate (95.2% trans(2), trans(4)).

EXAMPLE 34

To 0.5 g. of the acid of Example 33 in 10 ml. of benzene, under nitrogen, is added 0.055 g. of sodium hydride. After stirring at room temperature for 15 minutes, 0.17 ml. of oxalyl chloride is added followed by stirring for 2.5 hours. Then 2 ml. of isopropanol is added. After about 3 hours, the reaction is worked up by extraction with ether, washing with sodium bicarbonate and brine, drying over calcium sulfate and isolation to yield isopropyl 11-methoxy-3,7,11-trimethyldodeca - 2,4 - dienoate (about 91% trans, trans).

EXAMPLE 35

To 0.5 g. of the acid of Example 33 in 10 ml. of benzene, under nitrogen is added 0.17 ml. of oxalyl chloride which is stirred for about 45 minutes and then allowed to stand 2 hours. Two ml. of isopropanol is added. After 3 hours, ether is added and organic layer separated. The organic layer is washed with aqueous sodium bicarbonate and brine, dried over clcium sulfate and concentrated under reduced pressure to yield isopropyl 11-methoxy-3,7,11-trimethyldodeca-2,4-dienoate (about 91% trans, trans) which can be purified by chromatography and distillation.

Using the foregoing procedure, each of 3-thiacyclohexanol, 2,2,2-trifluoroethanol, t-butanol, 2-methoxyethanol, 2-methylthioethanol and s-butanol provides 3'-thiacyclohexyl 11-methoxy-3,7,11-trimethyldodeca-2,4-dienoate, 2',2',2'-trifluoroethyl 11-methoxy-3,7,11-trimethyldodeca-2,4-dienoate, t-butyl 11-methoxy-3,7,11-trimethyldodeca-2,4-dienoate, 2'-methoxyethyl 11-methoxy-3,7,11-trimethyldodeca-2,4-dienoate, 2'-methylthioethyl 11-methoxy-3,7,11-trimethyldodeca-2,4-dienoate, and s-butyl 11-methoxy-3,7,11-trimethyldodeca-2,4-dienoate.

Each of the esters is primarily the trans(2), trans(4) isomer.

EXAMPLE 36

Sodium ethoxide (prepared from 0.2 g. of sodium and 12 ml. of ethanol) is slowly added to a mixture of 1.1 g. of 7-ethoxy-3,7-dimethyloctan-1-al, diethyl 3-ethoxycarbonyl-2-methylprop-2-enyl phosphonate and 50 ml. of dimethylformamide, with stirring, under nitrogen, at 0°. The reaction is stirred for 1.5 hours after addition is complete and then worked up by extraction with ether to yield ethyl 11-ethoxy-3,7,11-trimethyldodeca - 2,4 - dienoate, mostly trans(2), trans(4) which can be further purified by chromatography and distillation.

EXAMPLE 37

To a mixture of 10 g. of 7-methoxy-3,7-dimethyloctan-1-al, 17 g. of diethyl 3-ethoxycarbonyl-2-methylprop-2-enyl phosphonate (77% trans), and 150 ml. of dimethylformamide, under nitrogen, 0°, with stirring, is added sodium isopropanolate (prepared from 1.5 g. of sodium in 150 ml. of isopropanol). After addition is complete, the reaction is stirred for 18 hours at room temperature and then worked up by extraction with hexane to yield isopropyl 11 - methoxy-3,7,11-trimethyldodeca-2,4-dienoate (mostly trans-2, trans-4) which can be chromatographed and distilled for further purification.

EXAMPLE 38

A mixture of 5 g. of hydroxycitronellal (7-hydroxy-3,7-dimethyloctan-1-al), 8.5 g. of di-isopropyl 3-ethoxy-carbonyl-2-methylprop-2-enylphosphonate, and 40 ml. of dimethylformamide, under nitrogen and cooled in an icebath, is stirred at room temperature for 3 hours and then hexane/water (1/1) added. The organic layer is washed with water and brine, dried over calcium sulfate and concentrated. The concentrate is filtered through Florisil using hexane and hexane/ether. The filtrate is concentrated and then distilled to yield ethyl 11-hydroxy-3,7,11-trimethyldodeca-2,4-dienoate (about 85% trans-2, trans-4).

The process of this example is repeated with the exception of using di-isopropyl 3-isopropoxy carbonyl-2-methylprop-2-enyl-phosphonate to prepare isopropyl 11-hydroxy-3,7,11-trimethyldodeca-2,4-dienoate, about 78% trans(2), trans(4) and 21% cis(2), trans(4).

EXAMPLE 39

To 40 ml. of ice cold isopropanol is added 320 mg. of acetyl chloride. The resulting solution is stirred at 0° for 15 min. and 1.0 g. of trans isopropyl 3,7,11-trimethyldodeca-2,4,10-trienoate added. The solution is stirred for one hour at 0° and for two hours at 25°. Solvent is removed under reduced pressure and the concentrate taken up in hexane. The hexane solution is washed with water until the aqueous wash is neutral and then with brine. The solution is dried over calcium sulfate and solvent evaporated to yield trans isopropyl 11-chloro-3,7,11-trimethyldodeca-2,4-dienoate.

EXAMPLE 40

(A) 100 grams of 3,7-dimethyloct-6-en-1-ol is dissolved in 150 ml. of pyridine and 100 ml. of acetic anhydride and left at room temperature for about 48 hours. Then the mixture is extracted with ether and the ethereal extracts washed with water, 10% aqueous HCl and brine to yield 1-acetoxy-3,7-dimethyloct-6-ene which is purified by distillation.

(B) 150 grams of mercuric acetate in 400 ml. of dry ethanol is added to 100 g. of 1-acetoxy-3,7-dimethyloct-6-ene (citronellol acetate) in 200 ml. of dry ethanol cooled in an ice bath. The temperature is allowed to come to room temperature by standing overnight. Then the mixture is cooled to 0°, 100 g. of potassium hydroxide in 1.5 l of ethanol is added followed by addition of 10 g. of sodium borohydride in small portions. After about 30 minutes at 0°, water (100 ml.) is added and mixture left at room temperature for two hours. The mixture is filtered, filtrate concentrated and extracted with ether. The ethereal extract is washed, dried and evaporated to yield 7-ethoxy-3,7-dimethyloctan-1-ol which is purified by distillation or chromatography.

By using methanol in the foregoing process in place of ethanol, there is obtained 7-methoxy-3,7-dimethyloctan-1-ol.

(C) A mixture of 1.9 of 7-ethoxy-3,7-dimethyloctan-1-ol and 10 ml. of pyridine is added to a suspension of 8.0 g. of chromium trioxide in 100 ml. of pyridine with stirring under nitrogen. After about 4 hours at room temperature, the reaction is poured into saturated sodium bicarbonate and worked up with ether followed by washing with 2 N NaOH, water, 10% HCl, water and brine and evaporated under reduced pressure to dryness and then filtered with hexane to yield 7-ethoxy-3,7-dimethyloctan-1-al.

(D) A mixture of 9.0 g. of 7-ethoxy-3,7-dimethyloctan-1-al and 15 g. of triphenylphosphineacetylmethylene in 100 ml. of dry toluene, under nitrogen, is refluxed for 20 hours. Thereafter, the toluene is evaporated and pentane added to remove triphenylphosphine. After concentration, the product is distilled to yield 10-ethoxy-6,10-dimethylundec-3-en-2-one. The thus-prepared ketone is reacted with the carbanion of diethyl carbethoxymethylphosphonate using the procedure of Example 1 or 9 to prepare ethyl-11-ethoxy-3,7,11-trimethyldodeca-2,4-dienoate.

EXAMPLE 41

Each of the aldehydes under Col. XIV is reacted with the carbanion of di-isopropyl 3-isopropoxycarbonyl-2-methylprop-2-enyl phosphonate using the procedure of Example 38 to prepare the respective isopropyl ester under Col. XV.

XIV 3,6,7-trimethyloct-6-en-1-al
3,6,7-trimethylnon-6-en-1-al
2,5-dimethylhex-4-en-1-al
2,4,5-trimethyl-4-en-1-al
3,5,6-trimethylhept-5-en-1-al
2,5,6-trimethylhept-5-en-1-al
3,8-dimethylnon-7-en-1-al
3,9-dimethyldec-8-en-1-al

XV isopropyl 3,7,10,11-tetramethyldodeca-2,4,10-trienoate
isopropyl 3,7,10,11-tetramethyltrideca-2,4,10-trienoate
isopropyl 3,6,9-trimethyldeca-2,4,8-trienoate
isopropyl 3,6,8,9-tetramethyldeca-2,4,8-trienoate
isopropyl 3,7,9,10-tetramethylundeca-2,4,9-trienoate
isopropyl 3,6,9,10-tetramethylundeca-2,4,9-trienoate
isopropyl 3,7,12-trimethyltrideca-2,4,11-trienoate
isopropyl 3,7,13-trimethyltetradeca-2,4,12-trienoate The reaction of the aldehydes under Col. XIV with the carbanion of diethyl 3-methoxycarbonyl-2-methylprop-2-enylphosphonate yields the respective methyl tri-unsaturated esters. In the same way the respective ethyl tri-unsaturated esters are prepared using diethyl 3-ethoxycarbonyl-2-methylprop-2-enylphosphonate.

Hydrochlorinated derivatives of the above esters are prepared using the procedure of Example 14 or 39. For example, isopropyl 11-chloro-3,7,10,11-tetramethyldodeca-2,4-dienoate,
isopropyl 11-chloro-3,7,10,11-tetramethyltrideca-2,4-dienoate,
isopropyl 10-chloro-3,7,9,10-tetramethylundeca-2,4-dienoate, and
isopropyl 12-chloro-3,7-12-trimethyltrideca-2,4-dienoate.

Following the procedure of Example 23 or 29, methanol is added to the terminal double bond of each of the esters under Col. XV to prepare:

isopropyl 11-methoxy-3,7,10,11-tetramethyldodeca-2,4-dienoate,
isopropyl 11-methoxy-3,7,10,11-tetramethyltrideca-2,4-dienoate,
isopropyl 9-methoxy-3,6,9-trimethyldeca-2,4-dienoate,
isopropyl 9-methoxy-3,6,8,9-tetramethyldecan-2,4-dienoate,
isopropyl 10-methoxy-3,7,9,10-tetramethylundeca-2,4-dienoate,
isopropyl 10-methoxy-3,6,9,10-tetramethylundeca-2,3-dienoate,
isopropyl 12-methoxy-3,7,12-trimethyltrideca-2,4-dienoate, and
isopropyl 13-methoxy-3,7,13-trimethyltetradeca-2,4-dienoate.

In the same way, ethanol is added to the terminal double bond to prepare the respective ethoxy substituted 2,4-dienoates. Using the procedure of Example 20, water is added to the terminal double bond to prepare the respective hydroxy-substituted 2,4-dienoate.

EXAMPLE 42

(A) Eighty ml. of a 3 M solution of methylmagnesium bromide in ether is added slowly to 31 g. of citronellal in 250 ml. of dry ether. The mixture is heated at reflux for about one hour, cooled to 0° and treated with saturated aqueous ammonium chloride until reaction subsides. The organic layer is separated and the aqueous layer extracted with ether. The organic layer and other extracts are combined, washed with water and brine and dried over magnesium sulfate. Evaporation of the solvent gives 4,8-dimethylnon-7-en-2-ol in 250 ml. of methylene chloride is cooled to about 10° as a solution of 46.4 g. of sodium dichromate in 125 ml. of water is added. The mixture is maintained at about 10° as a solution of 46.3 g. of sulfuric acid in 100 ml. of water is added over about 45 minutes. The mixture is allowed to attain room temperature and, after about 3 hours, the organic layer is separated and the aqueous layer is extracted with methylene chloride. The combined organic materials are washed with saturated potassium bicarbonate, water and saturated sodium chloride, dried over magnesium sulfate and evaporated to yield 4,8-dimethylnon-7-en-2-one.

The Grignard reaction of part A is repeated using each 3,7-dimethylnon-6-en-1-al, 3-methyl-7-ethylnon-6-en-1-al, 3,6,7-trimethyloct-6-en-1-al, 3,7,8-trimethylnon-7-en-1-al, 2,4,5-trimethylhex-4-en-1-al, 2,5-dimethylhex-4-en-1-al, 3,5,6-trimethylhept-5-en-1-al, 2,6-dimethylhept-5-en-1-al and 2,5,6-trimethylhept-5-en-1-al in place of citronellal to yield the respective secondary alcohol—

4,8-dimethyldec-7-en-2-ol
4-methyl-8-ethyldec-7-en-2-ol
4,7,8-trimethyldec-8-en-2-ol
4,8,9-trimethylono-7-en-2-ol
3,5,6-trimethylhept-5-en-2-ol
3,6-dimethylhept-5-en-2-ol
4,6,7-trimethyloct-6-en-2-ol
4,7-dimethyloct-6-en-2-ol
3,7-dimethyloct-6-en-2-ol
3,6,7-trimethyloct-6-en-2-ol Each of the above alcohols is oxidized to prepare the respective ketone—

4,8-dimethyldec-7-en-2-one
4-methyl-8-ethyldec-7-en-2-one
4,7,8-trimethylnon-7-en-2-one
4,8,9-trimethyldec-8-en-2-one
3,5,6-trimethylhept-5-en-2-one
3,6-dimethylhept-5-en-2-one
4,6,7-trimethyloct-6-en-2-one
4,7-dimethyloct-6-en-2-one
3,7-dimethyloct-6-en-2-one
3,6,7-trimethyloct-6-en-2-one Each of the ketones of part B is reacted with the carbanion of diethyl 3-ethoxycarbonyl-2-methylprop-2-enyl phosphonate according to procedures described above to prepare the respective tri-unsaturated ester i.e.— ethyl 3,5,7,11-tetramethyldodeca-2,4,10-trienoate
ethyl 3,5,7,11-tetramethyltrideca-2,4,10-trienoate
ethyl 3,5,7-trimethyl-11-ethyltrideca-2,4,10-trienoate
ethyl 3,5,7,10,11-pentamethyldodeca-2,4,10-trienoate
ethyl 3,5,7,11,12-pentamethyltrideca-2,4,11-trienoate
ethyl 3,5,6,8,9-pentamethyldeca-2,4,8-trienoate
ethyl 3,5,6,9-tetramethyldeca-2,4,8-trienoate
ethyl 3,5,7,9,10-pentamethylundeca-2,4,9-trienoate
ethyl 3,5,7,10-tetramethylundeca-2,4,9-trienoate
ethyl 3,5,6,10-tetramethylundeca-2,4,9-trienoate
ethyl 3,5,6,9,10-pentamethylundeca-2,4,9-trienoate

EXAMPLE 43

(A) Each of the ketones of part B of Example 42 is reacted with the carbanion of diethyl 3-ethoxycarbonyl-1,2-dimethylprop - 2 - enylphosphonate to prepare the respective trienoate, i.e.— ethyl 3,4,5,7,11-pentamethyldodeca-2,4,10-trienoate
ethyl 3,4,5,7,11-pentamethyltrideca-2,4,10-trienoate
ethyl 3,4,5,7-tetramethyl-11-ethyltrideca-2,4,10-trienoate
ethyl 3,4,5,7,10,11-hexamethyldodeca-2,4,10-trienoate
ethyl 3,4,5,7,11,12-hexamethyltrideca-2,4,11-trienoate
ethyl 3,4,5,6,8,9-hexamethyldeca-2,4,8-trienoate
ethyl 3,4,5,6,9-pentamethyldeca-2,4,8-trienoate
ethyl 3,4,5,7,9,10-hexamethylundeca-2,4,9-trienoate
ethyl 3,4,5,7,10-pentamethylundeca-2,4,9-trienoate
ethyl 3,4,5,6,10-pentamethylundeca-2,4,9-trienoate
ethyl 3,4,5,6,9,10-hexamethylundeca-2,4,9-trienoate (B) Each of the aldehydes under Col. I is reacted with the carbanion of diethyl 3-ethoxycarbonyl-1,2-dimethylprop - 2 - enyl phosphonate to prepare the respective trienoate, i.e.— ethyl 3,4,7,11-tetramethyltrideca-2,4,10-trienoate
ethyl 3,4,11-trimethyl-7-ethyltrideca-2,4,10-trienoate
ethyl 3,4-dimethyl-7,11-diethyltrideca-2,4,10-trienoate
ethyl 3,4,8,12-tetramethyltrideca-2,4,11-trienoate
ethyl 3,4,7,10-tetramethylundeca-2,4,9-trienoate
ethyl 3,4,7,10-tetramethyldodeca-2,4,9-trienoate
ethyl 3,4,6,10-tetramethylundeca-2,4,9-trienoate By use of the procedure of part B of this example, other aldehydes of Formula I ($R^{13}$ is hydrogen) are converted into the respective ester of Formula B' wherein $R^{13}$ is hydrogen and $R^{12}$ is methyl or other lower alkyl. Similarly following the procedure of part A of this example, other ketones of Formula I ($R^{13}$ is lower alkyl) are converted into esters of Formula B' wherein each of $R^{12}$ and $R^{13}$ is lower alkyl. Using the process of part C of Example 42 other esters of the present invention of Formula B' wherein $R^{12}$ is hydrogen and $R^{13}$ is methyl or other lower alkyl can be prepared using a ketone of Formula I ($R^{13}$ is lower alkyl) as the precursor.

(C) Each of the esters of this example and Example 42 can be hydrolyzed to the free acid according to the procedure of Example 3 or 33. The acid or acid chloride can be reacted with an alcohol such as isopropanol, t-butanol, benzyl alcohol, and the like to prepare the other esters of the present invention.

EXAMPLE 44

Following the process of Example 35, 11-methoxy-3,7,11-trimethyldodeca-2,4-dienoic acid is esterified using each of cyclohexanol, n-propanol, i-butanol, benzyl alcohol, phenol n-hexanol, 3,3-dimethylpentan-1-ol, 2-methylpentan-1-ol, hexan-2-ol, 3-methylpentan-1-ol, p-ethylphenol, β-phenylethanol, 2-fluoroethanol, 2,2-dichloroethanol, 2-chloropropan-1-ol, 2,2,2-trichloroethanol and p-methylthiophenol to prepare the respective ester.

cyclohexyl 11-methoxy-3,7,11-trimethyldodeca-2,4-dienoate
n-propyl 11-methoxy-3,7,11-trimethyldodeca-2,4-dienoate
i-butyl 11-methoxy-3,7-11-trimethyldodeca-2,4-dienoate
benzyl 11-methoxy-3,7,11-trimethyldodeca-2,4-dienoate
phenyl 11-methoxy-3,7,11-trimethyldodeca-2,4-dienoate
n-hexyl 11-methoxy-3,7,11-trimethyldodeca-2,4-dienoate
3.,3'-dimethylpentyl 11-methoxy-3,7,11-trimethyldodeca-2,4-dienoate
2'-methylpentyl 11-methoxy-3,7,11-trimethyldodeca-2,4-dienoate
hexan-2'-yl 11-methoxy-3,7,11-trimethyldodeca-2,4-dienoate
3'-methylpentyl 11-methoxy-3,7,11-trimethyldodeca-2,4-dienoate
p-ethylphenyl 11- methoxy-3,7,11-trimethyldodeca-2,4-dienoate
β-phenylethyl 11-methoxy-3,7,11-trimethyldodeca-2,4-dienoate
2'-fluoroethyl 11-methoxy-3,7,11-trimethyldodeca-2,4-dienoate
2',2'-dichloroethyl 11-methoxy-3,7,11-trimethyldodeca-2,4-dienoate
2'-chloropropyl 11-methoxy-3,7,11-trimethyldodeca-2,4-dienoate
2',2',2'-trichloroethyl 11-methoxy-3,7,11-trimethyldodeca-2,4-dienoate
p-methylthiophenyl 11-methoxy-3,7,11-trimethyldodeca-2,4-dienoate

EXAMPLE 45

To a solution of 0.5 g. of trans, trans 11-methoxy-3,7,11-trimethyldodeca-2,4-dienoic acid in 15 ml. of benzene is added, with stirring, an equivalent amount of potassium hydride. The mixture is stirred at room temperature for about 2 hours and then evaporated to give potassium 11-methoxy-3,7,11-trimethyldodeca-2,4-dienoate.

In place of KH, there can be used KOH, NaOH, and the like to form the corresponding salt.

EXAMPLE 46

Methanol is added to the terminal bond of ethyl 3,4,7,11-tetramethyldodeca-2,4,10-trienoate using the process of Example 23 or 29 to give ethyl 11-methoxy-3,4,7,11-tetramethyldodeca-2,4-dienoate. In the same manner, water is added to give ethyl 11-hydroxy-3,4,7,11-tetramethyldodeca-2,4-dienoate. Similarly, there is prepared ethyl 11-methoxy-3,5,7,11-tetramethyldodeca-2,4-dienoate and ethyl 11 - hydroxy-3,5,7,11-tetramethyldodeca-2,4-dienoate from ethyl 3,5,7,11 - tetramethyldodeca - 2,4,10 - trienoate. The hydrochloride, ethyl 11-chloro-3,4,7,11-tetramethyldodeca-2,4-dienoate and ethyl 3,5,7,11-tetramethyldodeca-2,4-dienoate are prepared from the trienoate using the process of Example 39.

EXAMPLE 47

(A) To a solution of 1.8 g. of 6,10-dimethylundeca-3,9-dien-2-one in 20 ml. of ethanol, cooled to 0° by an ice bath is added a suspension of 2.32 g. of mercuric acetate in 50 ml. of ethanol over 15 minutes. The reaction mixture is stirred for two hours and then, with cooling, to —20°, 1.22 g. of potassium hydroxide in 20 ml. of ethanol is added. Then 0.139 g. of sodium borohydride is adder in small portions and stirring continued for 30 minutes at —20°. The solution is decanted, then concentrated to half volume, diluted with 100 ml. of water and extracted with ether (3× 50). The ethereal phase is washed with water, dried over magnesium sulfate and the crude product chromatographed on silica to yield 10-ethoxy-6,10-ethoxy-6,10-dimethylundec-3-en-2-one.

The process of this example is repeated using each of the compounds under Column VI as the starting material to prepare the respective ethoxy substituted compound under Column XVI.

XVI 10-ethoxy-6,10-dimethyldodec-3-en-2-one
10-ethoxy-6-methyl-10-ethyldodec-3-en-2-one
10-ethoxy-6,10-diethyldodec-3-en-2-one
11-ethoxy-7,11-dimethyldodec-3-en-2-one
9-ethoxy-6,9-dimethyldec-3-en-2-one
9-ethoxy-6,9-dimethylundec-3-en-2-one
9-ethoxy-5,9-dimethyldec-3-en-2-one Following the process of Example 13, 10-ethoxy-6,10-dimethylundec-3-en-2-one is converted into methyl 11-ethoxy-3,7,11-trimethyldodec-2,4-dienoate. Reaction of 10-ethoxy-6,10-dimethylundec-3-en-2-one with the carbanion of diethyl carboethoxymethylphosphonate yields ethyl 11-ethoxy-3,7,11-trimethyldodeca-2,4-dienoate.

By using other alcohols in the process of this example in lieu of ethanol, such as methanol, etc., the respective ethes are obtained, e.g. 10-methoxy-6,10-dimethylundec-3-en-2-one.

(B) The process of part A is repeated using the starting material 3,7-dimethyloct-5-en-1-al and each of the aldehydes under Column I or the acetal thereof to prepare the respective compounds under Column XVII.

XVII 7-ethoxy-3,7-dimethyloctan-1-al
7-ethoxy-3,7-dimethylnonan-1-al
7-ethoxy-3-ethyl-7-methylnonan-1-al
7-ethoxy-3,7-diethylnonan-1-al
8-ethoxy-4,8-dimethylnonan-1-al
6-ethoxy-3,6-dimethylheptan-1-al
6-ethoxy-3,6-dimethyloctan-1-al
6-ethoxy-2,6-dimethylheptan-1-al Using 7-ethoxy-3,7-dimethyloctan-1-al or the acetal thereof as the starting material in the process of either Examples 9, 10 or 11, there is prepared 10-ethoxy-6,10-dimethylundec-3-en-2-one.

EXAMPLE 48

A mixture of 0.6 g. of 11-methoxy-3,7,11-trimethyldodeca 2,4-dienoic acid (mostly trans, trans), 10 ml. of dry benzene and 0.21 ml. of oxalyl chloride is allowed to stand at room temperature with occasion stirring for about 2.5 hours. The mixture is cooled in cold water and then 0.18 ml. of ethylmercaptan added. The reaction is stirred and 10 drops of dry pyridine added. The reaction is stirred at room temperature for 2 hours and then worked up by addition of ether and saturated sodium bicarbonate, washing of organic phase and removal of solvent to yield crude ethyl 11-methoxy-3,7,11-trimethyl-thiododeca-2,4-dienoate (mostly trans, trans) which is separated by preparative of thin layer chromatography.

EXAMPLE 49

To 0.55 g. of 11-methoxy-3,7,11-trimethyldodeca-2,4-dienoic acid in 10 ml. of dry benzene is added 0.21 ml. of oxalyl chloride. The mixture is stirred occasionally at room temperature for about 2.5 hours. The mixture is cooled in cold water and then 0.18 ml. of ethylmercaptan is added with stirring. The mixture is then stirred at room temperature for about 24 hours. Ether and saturated sodium bicarbonate is added and the organic phase separated. The organic phase is washed with aqueous sodium bicarbonate, saturated sodium chloride, dried over calcium sulfate and evaporated to yield ethyl 11-methoxy-3,7,11-trimethyl-thiododeca-2,4-dienoate.

Thiol esters are prepared using each of n-propyl mercaptan isopropyl mercaptan, isobutyl mercaptan, s-butyl mercaptan, n-butyl mercaptan, benzyl mercaptan, cyclopentyl mercaptan, β-phenylethyl mercaptan, t-amyl mercaptan and n-hexyl mercaptan in reaction with 11-methoxy-3,7,11-trimethyldodeca-2,4-dienoyl chloride or the sodium salt of 11-methoxy-3,7,11-trimethyldodeca-2,4-dineoic acid to yield n-propyl-11-methoxy-3,7,11-trimethyl-thioldodeca-2,4-dienoate
isopropyl 11-methoxy-3,7,11-trimethyl-thiododeca-2,4-dienoate
isopropyl 11-methoxy-3,7,11-trimethyl-thioldodeca-2,4-dienoate
s-butyl 11-methoxy-3,7,11-trimethyl-thioldodeca-2,4-dienoate
n-butyl 11-methoxy-3,7,11-trimethyl-thioldodeca-2,4-dienoate
benzyl 11-methoxy-3,7,11-trimethyl-thioldodeca-2,4-dienoate
cyclopentyl 11-methoxy-3,7,11-trimethyl-thioldodeca-2,4-dienoate
β-phenylethyl 11-methoxy-3,7,11-thioldodeca-2,4-dienoate
t-amyl 11-methoxy-3,7,11-thioldodeca-2,4-dienoate
n-hexyl 11-methoxy-3,7,11-thioldodeca-2,4-dienoate Thiol acids of the present invention are prepared by the reaction of hydrogen sulfide with an acid chloride of Formula A or B. For example, a solution of 11-methoxy-3,7,11-trimethyldodeca-2,4-dienoyl chloride in benzene is added to benzene saturated with hydrogen sulfide and the mixture allowed to stand for about 2 hours with continuous introduction of nitrogen. The reaction is worked up as described above to yield 11-methoxy-3,7,11-trimethylthioldodeca-2,4-dienoic acid. Thiol acids serve as precursors for the preparation of other thiol esters of the present invention.

EXAMPLE 50

To a solution of 25.4 g. of 3,7,11-trimethyldodeca-2,4,10-trienoyl chloride in ether is added 12.4 g. of ethylmercaptan and 11.6 g. of pyridine at −40°. The mixture is allowed to stand at 0° for about 3 hours and then is diluted with ether and water and separated. The ether phase is washed with dilute aqueous sodium hydroxide, dilute hydrochloric acid and then water, dried and solvent removed to yield ethyl 3,7,11-trimethyl-thioldodeca-2,4,10-trienoate.

The process of this example or Example 49 is repeated using each of the acid chlorides under Column XVIII to prepare the respective thiol ester under Column XIX.

XVIII 3,7,11-trimethyltrideca-2,4,10-trienoyl chloride
3,11-dimethyl-7-ethyltrideca-2,4,10-trienoyl chloride
7,11-diethyl-3-methyltrideca-2,4,10-trienoyl chloride
3,7,10-trimethylundeca-2,4,9-trienoyl chloride
3,7,10-trimethyldodeca-2,4,9-trienoyl chloride
3,6,10-trimethylundeca-2,4,9-trienoyl chloride
3,7,10,11-tetramethyldodeca-2,4,10-trienoyl chloride
3,5,7,11-tetramethyldodeca-2,4,10-trienoyl chloride
3,4,7,11-tetramethyldodeca-2,4,10-trienoyl chloride
3,5,7,10,11-pentamethyldodeca-2,4,10-trienoyl chloride

XIX ethyl 3,7,11-trimethyl-thioltrideca-2,4,10-trienoate
ethyl 3,11-dimethyl-7-ethyl-thioltrideca-2,4,10-trienoate
ethyl 7,11-diethyl-3-methyl-thioltrideca-2,4,10-trienoate
ethyl 3,7,10-trimethyl-thiolundeca-2,4,9-trienoate
ethyl 3,7,10-trimethyl-thioldodeca-2,4,9-trienoate
ethyl 3,6,10-trimethyl1thiolundeca-2,4,9-trienoate
ethyl 3,7,10,11-tetramethyl-thioldodeca-2,4,10-trienoate
ethyl 3,5,7,11-tetramethyl-thioldodeca-2,4,10-trienoate
ethyl 3,4,7,11-tetramethyl-thioldodeca-2,4,10-trienoate
ethyl 3,5,7,10,11-pentamethyl-thioldodeca-2,4,10-trienoate Methylmercaptan is reacted with each of the trienoyl-chlorides above using the procedure of this example or Example 49 except that the reaction mixture is prepared at about —10° and the reaction is carried out in a sealed vessel to prepare the respective methyl thiol esters, e.g., methyl 3,7,11-trimethyl-thioldodeca - 2,4,10 - trienoate, methyl 3,7,11-trimethyl-thioldodeca-2,4,10-trienoate, etc.

EXAMPLE 51

3,7,11-trimethyltrideca-2,4,10-trienoyl chloride (18 g.) is added slowly to ethyl lead mercaptide (13.4 g.) covered with ether. The mixture is allowed to stand overnight and then is filtered. The filtrate is evaporated under reduced pressure to yield ethyl 3,7,11-trimethyl-thioltrideca-2,4,10-trienoate which can be purified by chromatography.

EXAMPLE 52

Fifteen grams of mercuric acetate in 50 ml. of dry ethanol is added to 12 g. of ethyl 3,7,11-trimethyl-thiol-dodeca-2,4,10-trienoate in 30 ml. of dry ethanol cooled in an ice bath. The temperature is allowed to come to room temperature by standing overnight. Then the mixture is cooled to 0°, 10 g. of potassium hydroxide in 150 ml. of ethanol is added followed by addition of 1.0 g. of sodium borohydride in small portions. After about 30 minutes at 0°, water is added and mixture left at room temperature for two hours. The mixture is filtered, filtrate concentrated and extracted with ether. The ethereal extract is washed, dried and evaporated to yield ethyl 11-ethoxy-3,7,11-trimethylthioldodeca-2,4-dienoate which is purified by chromatography.

By using methanol in the foregoing process in place of ethanol, there is prepared the respective 11-methyl ether.

Using each of the esters under Column XIX as the starting material in the process of this example, there is prepared the respective substituted ester under Column XX.

XX ethyl 11-ethoxy-3,7,11-trimethyl-thioltrideca-2,4-dienoate
ethyl 11-ethoxy-3,11-dimethyl-7-ethyl-thioltrideca-2,4-dienoate
ethyl 11-ethoxy-7,11-diethyl-3-methyl-thioltrideca-2,4-dienoate
ethyl 10-ethoxy-3,7,10-trimethyl-thiolundeca-2,4-dienoate
ethyl 10-ethoxy-3,7,10-trimethyl-thioldodeca-2,4-dienoate
ethyl 10-ethoxy-3,6,10-trimethyl-thiolundeca-2,4-dienoate
ethyl 11-ethoxy-3,7,10,11-tetramethyl-thioldodeca-2,4-dienoate
ethyl 11-ethoxy-3,5,7,11-tetramethyl-thioldodeca-2,4-dienoate
ethyl 11-ethoxy-3,4,7,11-tetramethyl-thioldodeca-2,4-dienoate
ethyl 11-ethoxy-3,5,7,10,11-pentamethyl-thioldodeca-2,4-dienoate

EXAMPLE 53

To a mixture of 1.9 g. of mercuric acetate, 6 ml. of water and 20 ml. of tetrahydrofuran is added 1.49 g. of ethyl 3,7,11-trimethyl-thioldodeca-2,4,10-trienoate slowly. After addition is complete, the reaction mixture is stirred for about 20 minutes. The mixture is cooled to about 0° and 6 ml. of aqueous sodium hydroxide (3 molar) is added followed by 0.49 g. of sodium borohydride in aqueous sodium hydroxide (about 3 molar). The mixture is stirred for about 30 minutes. The mixture is then decanted, concentrated, diluted with water and then extracted with ether. The ethereal extract is washed with water, dried over magnesium sulfate and the product chromatographed to yield ethyl 11-hydroxy-3,7,11-trimethyl-thioldodeca-2,4-dienoate.

The above process is repeated using each of the unsaturated esters under Column XIX to prepare the respective compounds under Column XXI.

XXI ethyl 11-hydroxy-3,7,11-trimethyl-thioltrideca-2,4-dienoate
ethyl 11-hydroxy-3,11-dimethyl-7-ethyl-thioltrideca-2,4-dienoate
ethyl 11-hydroxy-7,11-diethyl-3-methyl-thioltrideca-2,4-dienoate
ethyl 10-hydroxy-3,7,10-trimethyl-thiolundeca-2,4-dienoate
ethyl 10-hydroxy-3,7,10-trimethyl-thioldodeca-2,4-dienoate
ethyl 10-hydroxy-3,6,10-trimethyl-thiolundeca-2,4-dienoate
ethyl 11-hydroxy-3,7,10,11-tetramethyl-thioldodeca-2,4-dienoate
ethyl 11-hydroxy-3,5,7,11-tetramethyl-thioldodeca-2,4-dienoate
ethyl 11-hydroxy-3,4,7,11-tetramethyl-ethioldodeca-2,4-dienoate
ethyl 11-hydroxy-3,5,7,10,11-pentamethyl-thioldodeca-2,4-dienoate Following the procedure of Example 24 or 25, each of the above hydroxy substituted thiol esters is converted into the respective carboxylic acyloxy, e.g. acetoxy, substituted thiol esters. For example, ethyl 11-acetoxy-3,7,11-trimethyl - thiol - dodeca-2,4-dienoate. Similarly, formates can be prepared from the thiol-trienoates or hydroxy-substituted thiol-dienoates.

One gram of ethyl 11-hydroxy-3,7,11-trimethyl-thiol-dodeca-2,4-dienoate in 10 ml. of diglyme is added dropwise to a slurry of 1 g. of sodium hydride in 10 ml. of diglyme under nitrogen. To this mixture is added 0.9 g. of cyclohexylchloride. The reaction mixture is stirred at about 25° for 30 minutes and then quenched in ice water. The organic phase is separated and aqueous phase re-extracted with ether. The organic materials are washed with water, dried over sodium sulfate and evaporated to yield the cyclohexyl ether of ethyl 11-hydroxy-3,7,11-trimethyl-thioldodeca-2,4-dienoate.

By using each of benzyl chloride and cyclopentyl chloride in the foregoing procedure, the corresponding benzyl ether and cyclopentyl ether is prepared.

By use of the procedure of Example 25, ethyl 11-hydroxy - 3,7,11-trimethyl-thioldodeca-2,4-dienote is converted into the corresponding 11-chloroacetate, 11-dichloracetate and 11-trichloroacetate using chloracetyl chloride, dichloroacetyl chloride and trichloroacetyl chloride, respectively.

The respective 11-triflouroacetate, propionate, n-butanoate, n-pentanoate and n-hexanoate esters of ethyl 11-hydroxy-3,7,11-trimethyl-thioldodeca-2,4-dienoate are prepared according to the process of Example 24 using trifluoroacetic anhydride, propionic anhydride, n-butyric anhydride, n-pentanoic anhydride and n-hexanoic anhydride or according to the process of Example 25 using the corresponding acid chloride.

EXAMPLE 54

(A) Anhydrous hydrogen chloride is bubbled into 100 ml. of dry carbon tetrachloride at 0° until one equivalent is taken up. Five grams of ethyl 3,7,11-trimethylthioldodeca-2,4,10-trienoate is added and the resulting mixture allowed to stand for about 48 hours at —20°. The mixture is evaporated under reduced pressure to yield ethyl 11-chloro-3,7,11-trimethylthioldodeca-2,4-dienoate, which is purified by chromatography.

The above process or the process of Example 39 is repeated using each of the unsaturated compounds under Column XIX to prepare the respective chloride under Column XXII.

XXII ethyl 11-chloro-3,7,11-trimethylthioltrideca-2,4-dienoate,
ethyl 11-chloro-3,11-dimethyl-7-ethylthioltrideca-2,4-dienoate,
ethyl 11-chloro-7,11-diethyl-3-methylthioltrideca-2,4-dienoate,
ethyl 10-chloro-3,7,10-trimethylthioundeca-2,4-dienoate,
ethyl 10-chloro-3,7,10-trimethylthiododeca-2,4-dienoate,
ethyl 10-chloro-3,6,10-trimethylthioundeca-2,4-dienoate,
ethyl 11-chloro-3,7,10,11-tetramethylthioldodeca-2,4-dienoate,
ethyl 11-chloro-3,5,7,11-tetramethylthioldodeca-2,4-dienoate,
ethyl 11-chloro-3,4,7,11-tetramethylthioldodeca-2,4-dienoate,
ethyl 11-chloro-3,5,7,10,11-pentamethylthioldodeca-2,4-dienoate.

By using each of hydrogen bromide and hydrogen fluoride in the above process, the respective bromides and fluorides are prepared, e.g., ethyl 11-bromo-3,7,11-trimethylthioldodeca-2,4-dienoate, ethyl 11-fluoro-3,7,11-trimethylthioldodeca-2,4-dienoate, etc.

(B) Chlorine gas is bubbled into 200 ml. of carbon tetrachloride at 0° until one equivalent is taken up. Twenty-five grams of ethyl 3,7,11-trimethylthioldodeca-2,4,10-trienoate is added and the mixture stirred and then allowed to stand at about $-20°$ for 24 hours. The mixture is then evaporated to yield ethyl 10,11-dichloro-3,7,11-trimethylthioldodeca-2,4-dienoate, which can be purified by chromatography.

By repeating the above process using each of the triunsaturated esters under Column XIX, the respective dichloro dienoates are prepared, i.e., ethyl 10,11-dichloro-3,7,11-trimethylthioltrideca-2,4-dienoate, ethyl 10,11-dichloro-3,11-dimethyl-7-ethylthioltrideca-2,4-dienoate, etc.

By using bromine in place of chlorine in the foregoing process, the respective dibromo derivatives are prepared, i.e., ethyl 10,11-dibromo-3,7,11-trimethylthioldodeca-2,4-dienoate, etc.

(C) To a mixture of 5 g. of ethyl 3,7,11-trimethylthioldodeca-2,4,10-trienoate in 100 ml. of fluorotrichloromethane, is slowly added one equivalent of anhydrous fluorine at about $-78°$. After stirring the mixture at this temperature for about 16 hours, the resultant mixture is evaporated and chromatographed on silica to yield ethyl 10,11-difluoro-3,7,11-trimethylthioldodeca-2,4-dienoate.

By repeating the above process using the tri-unsaturated esters under Column XIX, the respective difluoro dienoates are prepared, i.e., ethyl 10,11-difluoro-3,7,11-trimethylthioltrideca-2,4-dienoate, etc.

EXAMPLE 55

Two grams of 3,7,11-trimethyltrideca-2,4,10-trienoic acid chloride is added to 50 ml. of benzene, cooled to 0° and saturated with ammonia under nitrogen. The mixture is allowed to stand for about one hour and then it is washed with water, dried over sodium sulfate and evaporated to yield 3,7,11-trimethyltrideca-2,4,10-trienamide.

EXAMPLE 56

Three grams of 3,7,11-trimethyldodeca-2,4,10-trienoyl chloride in benzene is mixed with 2.5 g. of diethylamine in benzene and the resulting mixture allowed to stand at room temperature for about two hours. The mixture is concentrated under reduced pressure and the residue taken up in benzene, washed with dilute aqueous sodium bicarbonate and water, dried over sodium sulfate and evaporated to yield N,N-diethyl 3,7,11-trimethylodeca-2,4,10-trienamide.

By use of the foregoing procedure, each of dimethylamine, ethylamine, pyrrolidine, piperidine, aniline, morpholine and 2-methoxyethylamine is reacted with the acid chloride to yield the corresponding amide, that is, N,N-dimethyl 3,7,11-trimethyldodeca-2,4,10-trienamide N-ethyl 3,7,11,-trimethyldodeca-2,4,10-trienamide etc.

EXAMPLE 57

Two grams of 3,7,11-trimethyltrideca-2,4,10-trienoyl chloride is added to a solution of 2 g. of 4-ethylpiperazine and 20 ml. of tetrahydrofuran. The mixture is allowed to stand for four hours at 0°, then 50 ml. of benzene is added and the resulting mixture washed with water, dried over sodium sulfate and evaporated to yield N-(4′-ethylpiperazino)-3,7,11-trimethyltrideca-2,4,10-trienamide.

EXAMPLE 58

Following the process of Example 56, the acid chloride of each of the acids under Column III is reacted with diethylamine to prepare the respective amide:

N,N-diethyl 3,7,11-trimethyltrideca-2,4,10-trienamide,
N,N-diethyl 3,11-dimethyl-7-ethyltrideca-2,4,10-trienamide,
N,N-diethyl 3-methyl-7,11-diethyltrideca-2,4,10-trienamide,
N,N-diethyl 3,8,12-trimethyltrideca-2,4,11-trienamide,
N,N-diethyl 3,7,10-trimethylundeca-2,4,9-trienamide,
N,N-diethyl 3,7,10-trimethyldodeca-2,4,9-trienamide,
N,N-diethyl 3,6,10-trimethylundeca-2,4,9-trienamide.

EXAMPLE 59

The process of Example 1 is repeated with the exception of using diethyl 3-(N,N-diethylcarbonyl)-2-methylprop-2-enyl phosphonamide in place of the phosphonate to yield N,N-diethyl 3,7,11-trimethyldodeca-2,4,10-trienamide.

EXAMPLE 60

Sodium hydride (1.7 g., 57% in oil) is washed three times with dry hexane. The hexane is removed and 15 ml. of dry tetrahydrofuran is added. N,N-diethyl diethoxyphosphonoacetamide (0.9 g.), dissolved in 5 ml. of dry tetrahydrofuran, is added and stirred for about 40 minutes (0°). Then about 0.7 g. of 6,10-dimethyldodeca-3,9-dien-2-one in 5 ml. of dry tetrahydrofuran is added with stirring and cooling with an ice-bath. The ice-bath is removed after addition is completed and stirring continued for about two hours. Then the mixture is poured into water and extracted with ether. The ether extracts are combined, washed with water, dried over magnesium sulfate and evaporated under reduced pressure to yield cis/trans N,N-diethyl 3,7,11-trimethyltrideca-2,4,10-trienamide.

EXAMPLE 61

The procedure of Example 14 or 39 is repeated using N,N-diethyl 3,7,11-trimethyldodeca-2,4,10-trienamide and the amides of Example 58 to prepare:

N,N-diethyl 11-chloro-3,7,11-trimethyldodeca-2,4-dienamide
N,N-diethyl 11-chloro-3,7,11-trimethyltrideca-2,4-dienamide
N,N-diethyl 11-chloro-3,11-dimethyl-7-ethyltrideca-2,4-dienamide,
N,N-diethyl 11-chloro-3-methyl-7,11-diethyltrideca-2,4-dienamide,
N,N-diethyl 12-chloro-3,8,12-trimethyltrideca-2,4-dienamide,
N,N-diethyl 12-chloro-3,8,12-trimethyltrideca-2,4-dienamide,
N,N-diethyl 10-chloro-3,7,10-trimethyldodeca-2,4-dienamide,
N,N-diethyl 10-chloro-3,6,10-trimethylundeca-2,4-dienamide.

Each of N,N-dimethyl 3,7,11-trimethyltrideca-2,4,10-trienamide, N-methyl 3,7,11-trimethyltrideca-2,4,10-trienamide, N,N-isopropyl 3,7,11-trimethyltrideca-2,4,10-trienamide, N-ethyl 3,7,11-trimethyldodeca-2,4,10-trienamide and N,N-di-n-butyl 3,7,11-trimethyldodeca-2,4,10-trienamide is used as the starting material in the process of Example 14 or 39 to prepare the respective compound, that is, N,N-dimethyl 11-chloro-3,7,11-trimethyltrideca-2,4-dienamide, N-methyl 11-chloro-3,7,11-trimethyltrideca-2,4-dienamide, N,N-isopropyl 11-chloro-3,7,11-trimethyltrideca-2,4-dienamide, N-ethyl 11-chloro-3,7,11-trimethyldodeca-2,4-dienamide and N,N-di-n-butyl 11-chloro-3,7,11-trimethyldodeca-2,4-dienamide.

Using the procedure of Example 18 and 19, each of trans N,N-diethyl 10,11-dichloro-3,7,11-trimethyldodeca-2,4-dienamide, trans N,N-diethyl 10, 11-difluoro-3,7,11-trimethyldodeca-2,4-dienamide and trans N,N-diethyl 10, 11-dibromo-3,7,11-trimethyldodeca-2,4-dienamide is prepared from trans N,N-diethyl 3,7,11-trimethyldodeca-2,4,10-trienamide.

Following the procedure of Examples 16 and 17, each of N,N-diethyl 11-fluoro-3,7,11-trimethyldodeca-2,4-dienamide and N,N-diethyl 11-bromo-3,7,11-trimethyldodeca-2,4-dienamide is prepared from N,N-diethyl 3,7,11-trimethyldodeca-2,4,10-trienamide.

EXAMPLE 62

The procedure of Example 20 is utilized for the addition of water to the terminal double bond of N,N-diethyl 3,7,11-trimethyldodeca-2,4,10-trienamide and each of the amides of Example 58 to prepare:

N,N-diethyl 11-hydroxy-3,7,11-trimethyldodeca-2,4-dienamide,
N,N-diethyl 11-hydroxy-3,7,11-trimethyltrideca-2,4-dienamide,
N,N-diethyl 11-hydroxy-3,11-dimethyl-7-ethyltrideca-2,4-dienamide,
N,N-diethyl 11-hydroxy-3-methyl-7,11-diethyltrideca-2,4-dienamide,
N,N-diethyl 12-hydroxy-3,8,12-trimethyltrideca-2,4-dienamide,
N,N-diethyl 10-hydroxy-3,7,10-trimethylundeca-2,4-dienamide,
N,N-diethyl 10-hydroxy-3,7,10-trimethyldodeca-2,4-dienamide,
N,N-diethyl 10-hydroxy-3,6,10-trimethylundeca-2,4-dienamide.

Each of N,N-dimethyl 3,7,11-trimethyltrideca-2,4,10-trienamide, N-methyl 3,7,11 - trimethyltrideca-2,4,10-trienamide, N,N-isopropyl 3,7,11 - trimethyltrideca-2,4,10-trienamide, N-ethyl 3,7,11 - trimethyldodeca - 2,4,10-trienamide and N,N-di-n-butyl 3,7,11-trimethyldodeca-2,4,10-trienamide is used as the starting material in the process of Example 20 to prepare the respective hydroxyl, that is, N,N-dimethyl 11-hydroxy-3,7,11-trimethyltrideca-2,4-dienamide, N-methyl 11-hydroxy-3,7,11-trimethyltrideca-2,4-dienamide, N,N-isopropyl 11-hydroxy-3,7,11-trimethyltrideca-2,4-dienamide, N-ethyl 11-hydroxy-3,7,11-trimethyldodeca-2,4-dienamide and N,N-di-n-butyl 11-hydroxy-3,7,11-trimethyldodeca-2,4-dienamide.

Following the procedure of Example 23 or 29, ethanol is added to the terminal bond of N,N-diethyl 3,7,11-trimethyldodeca-2,4,10-trienamide and each of the amides of Example 58 to prepare:

N,N-diethyl 11-ethoxy-3,7,11-trimethyldodeca-2,4-dienamide,
N,N-diethyl 11-ethoxy-3,7,11-trimethyltrideca-2,4-dienamide,
N,N-diethyl 11-ethoxy-3,11-dimethyl-7-ethyltrideca-2,4-dienamide,
N,N-diethyl 11-ethoxy-3-methyl-7,11-diethyltrideca-2,4-dienamide,
N,N-diethyl 12-ethoxy-3,8,12-trimethyltrideca-2,4-dienamide,
N,N-diethyl 10-ethoxy-3,7,10-trimethyltrideca-2,4-dienamide,
N,N-diethyl 10-ethoxy-3,7,10-trimethyldodeca-2,4-dienamide,
N,N-diethyl 10-ethoxy-3,6,10-trimethylundeca-2,4-dienamide.

The respective methoxy 2,4-dienamides are prepared by repeating the above process and using methanol in place of ethanol. Thus, there is prepared N,N-diethyl 11-methoxy-3,7,11 - trimethyldodeca-2,4-dienamide, N-ethyl 11-methoxy-3,7,11-trimethyldodeca-2,4-dienamide, etc.

Each of the acid chlorides, 11-methoxy-3,7,11-trimethyldodeca-2,4-dienoyl chloride,
10-methoxy-3,7,10-trimethylundeca-2,4-dienoyl chloride,
11-methoxy-3,7,11-trimethyltrideca-2,4-dienoyl chloride,
11-methoxy-3,7,10,11-tetramethyldodeca-2,4-dienoyl chloride,
11-methoxy-3,11-dimethyl-7-ethyltrideca-2,4-dienoyl chloride,
11-methoxy-3,5,7,11-tetramethyldodeca-2,4-dienoyl chloride,
11-methoxy-3,4,7,11-tetramethyldodeca-2,4-dienoyl chloride,
11-methoxy-3,5,7,10,11-pentamethyldodeca-2,4-dienoyl chloride is reacted with ethylamine using the procedure of Example 56 to prepare the respective amide, i.e., N-ethyl 11-methoxy-3,7,11-trimethyldodeca-2,4-dienamide,
N-ethyl 10-methoxy-3,7,10-trimethylundeca-2,4-dienamide,
N-ethyl 11-methoxy-3,7,11-trimethyltrideca-2,4-dienamide,
N-ethyl 11-methoxy-3,7,10,11-tetramethyldodeca-2,4-dienamide,
N-ethyl 11-methoxy-3,11-dimethyl-7-ethyltrideca-2,4-dienamide,
N-ethyl 11-methoxy-3,5,7,11-tetramethyldodeca-2,4-dienamide,
N-ethyl 11-methoxy-3,4,7,11-tetramethyldodeca-2,4-dienamide,
N-ethyl 11-methoxy-3,5,7,10,11-pentamethyldodeca-2,4-dienamide.

The reaction of 11-hydroxy-3,7,11-trimethyldodeca-2,4-dienoyl chloride with ethylamine affords N-ethyl 11-hydroxy-3,7,11-trimethyldodeca-2,4-dienamide.

By use of the foregoing procedure, each of dimethylamine, isopropylamine, methylethylamine, pyrrolidine, piperidine, aniline, morpholine and 2-methoxyethylamine is reacted with 11 - methoxy-3,7,11-trimethyldodeca-2,4-dienoyl chloride to yield the corresponding amide, that is—

N,N-dimethyl 11-methoxy-3,7,11-trimethyldodeca-2,4-dienamide,
N-isopropyl 11-methoxy-3,7,11-trimethyldodeca-2,4-dienamide,
N-methyl-N-ethyl 11-methoxy-3,7,11-trimethyldodeca-2,4-dienamide,
pyrrolidino 11-methoxy-3,7,11-trimethyldodeca-2,4-dienamide,
piperidino 11-methoxy-3,7,11-trimethyldodeca-2,4-dienamide,
N-phenyl 11-methoxy-3,7,11-trimethyldodeca-2,4-dienamide,
morpholino 11-methoxy-3,7,11-trimethyldodeca-2,4-dienamide,
N-(2'-methoxyethyl) 11-methoxy-3,7,11-trimethyldodeca-2,4-dienamide.

EXAMPLE 63

Each of s-butylamine, isobutylamine, t-butylamine, methyl-isopropylamine, ethyl-n-propylamine, cyclohexylamine, allylamine, methallylamine, ethenylamine, 2-hydroxypropylamine and benzylamine is reacted with 11- methoxy-3,7,11-trimethyldodeca-2,4 - dienoyl chloride to prepare the respective amide, that is—

N-(s-butyl) 11-methoxy-3,7,11-trimethyldodeca-2,4-dienamide,
N-isobutyl 11-methoxy-3,7,11-trimethyldodeca-2,4-dienamide,
N-(t-butyl) 11-methoxy-3,7,11-trimethyldodeca-2,4-dienamide,
N-methyl N-isopropyl 11-methoxy-3,7,11-trimethyldodeca-2,4-dienamide,
N-methyl-N-propyl 11-methoxy-3,7,11-trimethyldodeca-2,4-dienamide,
N-cyclohexyl 11-methoxy-3,7,11-trimethyldodeca-2,4-dienamide,
N-allyl 11-methoxy-3,7,11-trimethyldodeca-2,4-dienamide,
N-methallyl 11-methoxy-3,7,11-trimethyldodeca-2,4-dienamide,
N-ethenyl 11-methoxy-3,7,11-trimethyldodeca-2,4-dienamide,
N-(2'-hydroxypropyl) 11-methoxy-3,7,11-trimethyldodeca-2,4-dienamide,
N-benzyl 11-methoxy-3,7,11-trimethyldodeca-2,4-dienamide.

EXAMPLE 64

To a stirred solution of 2.4 g. of 3,7,11-trimethyldodeca-2,4,10-trienoic acid in 20 ml. of dry ether is added slowly at 0°, 23 ml. of a one molar solution of ethyl lithium in benzene. After about three hours at 20°, the mixture is poured into iced 1 N hydrochloric acid (100 ml.) with vigorous stirring. The ether layer is separated, combined with ethereal washings of the aqueous phase, washed with water, saturated potassium bicarbonate and then saturated brine, dried over magnesium sulfate and concentrated under reduced pressure to yield 5,9,13-trimethyltetradeca-4,6,12-trien-3-one, which can be purified by chromatography.

By using methyl lithium, cyclopentyl lithium and phenyl lithium in the above process in place of ethyl lithium, there is prepared 4,8,12-trimethyltrideca-3,5,11-trien-2-one, cyclopentyl 2,6,10-trimethylundeca-1,3,9-trienyl ketone and phenyl 2,6,10-trimethylundeca-1,3,9-trienyl ketone, respectively.

The process of this example is repeated using each of the acids under Column III as the starting material to prepare the respective ketone, i.e., 5,9,13-trimethylpentadeca-4,6,12-trien-3-one,
5,13-dimethyl-9-ethylpentadeca-4,6,12-trien-3-one,
9,13-diethyl-5-methylpentadeca-4,6,12-trien-3-one,
5,10,14-trimethylpentadeca-4,6,13-trien-3-one,
5,9,12-trimethyltrideca-4,6,11-trien-3-one,
5,9,12-trimethyltetradeca-4,6,11-trien-3-one,
5,8,12-trimethyltrideca-4,6,11-trien-3-one.

Following the above procedure, each of the acids is reacted with methyl lithium to prepare the respective methyl ketones:

4,8,12-trimethyltetradeca-3,5,11-trien-2-one,
4,12-dimethyl-8-ethyltetradeca-3,5,11-trien-2-one,
8,12-diethyl-4-methyltetradeca-3,5,11-trien-2-one,
4,9,13-trimethyltetradeca-3,5,12-trien-2-one,
4,8,11-trimethyldodeca-3,5,10-trien-2-one,
4,8,11-trimethyltrideca-3,5,10-trien-2-one,
4,7,11-trimethyldodeca-3,5,10-trien-2-one.

Following the process of this example, each of 11-methoxy-3,7,11-trimethyldodeca - 2,4 - dienoic acid, 11-methoxy-3,7,10,11-tetramethyldodeca-2,4-dienoic acid and 3,7,9,10-tetramethylundeca-2,4,10-trienoic acid is reacted with ethyl lithium to prepare 13-methoxy-5,9,13-trimethyltetradeca-4,6-dien-3-one, 13-methoxy - 5,9,12,13 - tetramethyltetradeca-4,6-dien-3-one and 5,9,11,12-tetramethyltrideca-4,6,12-trien-3-one, respectively.

Utilizing the process of this example, isopropyl lithium is reacted with 3,7,11-trimethyldodeca-2,4,10-trienoic acid and 11-methoxy-3,7,11-trimethylodeca-2,4-dienoic acid to yield 2,5,9,13-tetramethyltetradeca-4,6,12-trien-3-one and 13 - methoxy-2,5,9,13-tetramethyltetradeca-4,6-dien-3-one.

EXAMPLE 65

To a solution of 2 g. of methyl 3,7,11-trimethyldodeca-2,4,10-trienoate and 20 ml. of dry ether, at —78°, is added slowly about 0.4 g. of lithium aluminum hydride in dry ether. The mixture is allowed to stand about one hour after addition is complete and then allowed to warm up to room temperature. Then 2.5 ml. of acetic acid is added. The mixture is then washed with ice water and the organic phase separated, which is dried over magnesium sulfate and evaporated to yield 3,7,11-trimethyldodeca-2,4,10-trien-1-ol.

By use of the process of this example, each of the esters under Column II or VII is reduced to prepare the respective allylic alcohol, i.e., 3,7,11-trimethyltrideca-2,4,10-trien-1-ol,
3,11-dimethyl-7-ethyltrideca-2,4,10-trien-1-ol,
7,11-diethyl-3-methyltrideca-2,4,10-trien-1-ol,
3,8,12-trimethyltrideca-2,4,11-trien-1-ol,
3,7,10-trimethylundeca-2,4,9-trien-1-ol,
3,7,10-trimethyldodeca-2,4,9-trien-1-ol,
3,6,10-trimethylundeca-2,4,9-trien-1-ol.

Each of:

methyl 3,7,10,11-tetramethyldodeca-2,4,10-trienoate,
methyl 11-methoxy-3,7,11-trimethyldodeca-2,4-dienoate,
methyl 10-methoxy-3,7,10-trimethylundeca-2,4-dienoate,
methyl 3,5,7,11-tetramethyldodeca-2,4,10-trienoate,
methyl 3,4,7,11-tetramethyldodeca-2,4,10-trienoate,
methyl 3,5,7,10,11-pentamethyldodeca-2,4,10-trienoate,
methyl 11-ethoxy-3,7,11-trimethyldodeca-2,4-dienoate and
methyl 11-chloro-3,7,11-trimethyldodeca-2,4-dienoate is reduced using lithium aluminum hydride to the respective C–1 alcohol, i.e., 3,7,10,11-tetramethyldodeca-2,4,10-trien-1-ol,
11-methoxy-3,7,11-trimethylundeca-2,4-dien-1-ol,
10-methoxy-3,7,10-trimethylundeca-2,4-dien-1-ol,
3,5,7,11-tetramethyldodeca-2,4,10-trien-1-ol,
3,4,7,11-tetramethyldodeca-2,4,10-trien-1-ol,
3,5,7,10,11-pentamethyldodeca-2,4,10-trien-1-ol,
11-ethoxy-3,7,11-trimethyldodeca-2,4-dien-1-ol and
11-chloro-3,7,11-trimethyldodeca-2,4-dien-1-ol.

EXAMPLE 66

A mixture of 2 g. of 3,7,11-trimethydodeca-2,4,10-trien-1-ol, 10 g. of manganese dioxide and 30 ml. of methylene dichloride is prepared by the slow addition of manganese dioxide so that the temperature does not exceed about 30°. The mixture is then shaken for about one hour, under nitrogen, at room temperature. The mixture is then filtered and the solid washed with ether. The filtrate and washings are combined and evaporated to yield 3,7,11-trimethyldodeca-2,4,10-trien-1-al, which can be purified by chromatography.

The process of this example is repeated using each of the alcohols of Example 65 to prepare the respective aldehydes:

3,7,11-trimethyltrideca-2,4,10-trien-1-al,
3,11-dimethyl-7-ethyltrideca-2,4,10-trien-1-al,
7,11-dimethyl-3-methyltrideca-2,4,10-trien-1-al,
3,8,12-trimethyltrideca-2,4,11-trien-1-al,
3,7,10-trimethylundeca-2,4,9-trien-1-al,
3,7,10-trimethyldodeca-2,4,9-trien-1-al,
3,6,10-trimethylundeca-2,4,9-trien-1-al,
3,7,10,11-tetramethyldodeca-2,4,10-trien-1-al,
11-methoxy-3,7,11-trimethyldodeca-2,4-dien-1-al,
10-methoxy-3,7,10-trimethylundeca-2,4-dien-1-al,
3,5,7,11-tetramethyldodeca-2,4,10-trien-1-al, 3,4,7,11-tetramethyldodeca-2,4,10-trien-1-al,
3,5,7,10,11-pentamethyldodeca-2,4,10-trien-1-al,
11-ethoxy-3,7,11-trimethyldodeca-2,4-dien-1-al,
11-chloro-3,7,11-trimethyldodeca-2,4-dien-1-al.

EXAMPLE 67

To a mixture of 1.9 g. of mercuric acetate, 6 ml. of water and 20 ml. of tetrahydrofuran is added 1.49 g. of 5,9,13-trimethyltetradeca-4,6,12-trien-3-one slowly. After addition is complete, the reaction mixture is stirred for about 20 minutes. The mixture is cooled to about 0° and 6 ml. of aqueous sodium hydroxide (3 molar) is added followed by 0.49 g. of sodium borohydride in aqueous sodium hydroxide (about 3 molar). The mixture is stirred for about 30 minutes. The mixture is then decanted, concentrated, diluted with water and then extracted with ether. The ethereal extract is washed with water, dried over magnesium sulfate and the product chromatographed on silica to yield 13-hydroxy-5,9,13-trimethyltetradeca-4,6-dien-3-one.

The above process is repeated using each of the compounds under Column XXIII as the starting material to prepare the respective hydroxyl substituted compounds under Column XXIV.

XXIII 5,9,13-trimethylpentadeca-4,6,12-trien-3-one,
5,13-dimethyl-9-ethylpentadeca-4,6,12-trien-3-one,
4,8,12-trimethyltetradeca-3,5,11-trien-2-one,
4,8,12-trimethyltrideca-3,5,11-trien-2-one,
4,12-dimethyl-8-ethyltetradeca-3,5,11-trien-2-one,
3,7,11-trimethyldodeca-2,4,10-trien-1-al,
3,7,11-trimethyltrideca-2,4,10-trien-1-al,
3,11-dimethyl-7-ethyltrideca-2,4,10-trien-1-al.

XXIV 13-hydroxy-5,9,13-trimethylpentadeca-2,6-dien-3-one,
13-hydroxy-5,13-dimethyl-9-ethylpentadeca-4,6,-dien-3-one,
12-hydroxy-4,8,12-trimethyltetradeca-3,5-dien-2-one,
12-hydroxy-4,8,12-trimethyltrideca-3,5-dien-2-one,
12-hydroxy-4,12-dimethyl-8-ethyltetradeca-3,5-dien-2-one,
11-hydroxy-3,7,11-trimethyldodeca-2,4-dien-1-al,
11-hydroxy-3,7,11-trimethyltrideca-2,4-dien-1-al,
11-hydroxy-3,11-dimethyl-7-ethyltrideca-2,4-dien-1-al.

Other hydroxy-substituted di-unsaturated ketones and aldehydes of Formula A can be prepared by the process of this example using tri-unsaturated ketone and aldehyde of Formula B or the acetal thereof as the precursor, such as those of Examples 64 and 66.

EXAMPLE 68

To a solution of 2 g. of 5,9,13-trimethyltetradeca-4,6,12-trien-3-one in 20 ml. of ethanol, cooled to 0° by an ice-bath, is added a suspension of 2.32 g. of mercuric acetate in 50 ml. of ethanol over 15 minutes. The reaction mixture is stirred for two hours and then, with cooling, to —20°, 1.22 g. of potassium hydroxide in 20 ml. of ethanol is added. Then 0.139 g. of sodium borohydride is added in small portions and stirring continued for 30 minutes at —20°. The solution is decanted, then concentrated to half volume, diluted with 100 ml. of water and extracted with ether (3× 50). The ethereal phase is washed with water, dried over magnesium sulfate and the crude product chromatographed on silica to yield 13-ethoxy-5,9,13-trimethyltetradeca-4,6-dien-3-one.

The process of this example is repeated using each of the compounds under Column XXIII as the starting material to prepare the respective 11-ethoxy-substituted compound under Column XXV.

XXV 13-ethoxy-5,9,13-trimethylpentadeca-4,6-dien-3-one,
13-ethoxy-5,13-dimethyl-9-ethylpentadeca-4,6-dien-3-one,
12-ethoxy-4,8,12-trimethyltetradeca-3,5-dien-2-one,
12-ethoxy-4,8,12-trimethyltrideca-3,5-dien-2-one,
12-ethoxy-4,12-dimethyl-8-ethyltetradeca-3,5-dien-2-one,
11-ethoxy-3,7,11-trimethyldodeca-2,4-dien-1-al,
11-ethoxy-3,7,11-trimethyltrideca-2,4-dien-1-al,
11-ethoxy-3,11-dimethyl-7-ethyltrideca-2,4-dien-1-al.

Other hydroxy-substituted di-unsaturated ketones and aldehydes of Formula A can be prepared by the process of this example using tri-unsaturated ketone or aldehyde of Formula B or the acetal thereof as the precursor.

By repeating the procedure of this example using other alcohols in place of ethanol, such as methanol, isopropanol, n-butanol, cyclopentyl alcohol or benzyl alcohol, the respective ethers are obtained, that is, 13-methoxy-5,9,13-trimethyltetradeca-4,6-dien-3-one, 13 - isopropoxy-5,9,13-trimethyltetradeca-4,6-dien - 3 - one, 13-n-butoxy-5,9,13-trimethyltetradeca-4,6-dien - 3 - one, 13-cyclopentyloxy-5,9,13-trimethyltetradeca-4,6-dien - 3 - one, 13-benzyloxy-5,9,13-trimethyltetradeca-4,6-dien-3-one, etc.

A mixture of 2 g. of dry 13-hydroxy-5,9,13-trimethylpentadeca-4,6-dien-3-one, 15 ml. of acetyl chloride and 20 ml. of dry pyridine under nitrogen is heated on a steam bath for about six hours. After cooling, the mixture is concentrated under vacuum and the residue taken up in ether. The ethereal extract is washed, dried over magnesium sulfate and evaporated to yield the corresponding 13-acetate.

The process of this example is repeated with the exception of using triethylamine in place of pyridine to yield the 13-acetate.

EXAMPLE 69

Anhydrous hydrogen chloride is bubbled into 100 ml. of dry carbon tetrachloride at 0° until one equivalent is taken up. Five grams of 5,9,13-trimethyltetradeca-4,6,12-trien-3-one is added and the resulting mixture allowed to stand for about 48 hours at —20°. The mixture is evaporated under reduced pressure to yield 13-chloro-5,9,13-trimethyltetradeca-4,6-dien - 3 - one, which is purified by chromatography.

The above process is repeated using each of the unsaturated compounds under Column XXIII to prepare the respective chloride under Column XXVI.

XXVI 13-chloro-5,9,13-trimethylpentadeca-4,6-dien-3-one,
13-chloro-5,13-dimethyl-9-ethylpentadeca-4,6-dien-3-one,
12-chloro-4,8,12-trimethyltetradeca-3,5-dien-2-one,
12-chloro-4,8,12-trimethyltrideca-3,5-dien-2-one,
12-chloro-4,12-dimethyl-8-ethyltetradeca-3,4-dien-2-one,
11-chloro-3,7,11-trimethyldodeca-2,4-dien-1-al,
11-chloro-3,7,11-trimethyltrideca-2,4-dien-1-al,
11-chloro-3,11-dimethyl-7-ethyltrideca-2,4-dien-1-al.

Chlorine gas is bubbled into 200 ml. of carbon tetrachloride at 0° until one equivalent is taken up. Twenty-five grams of 5,9,13-trimethyltetradeca-4,6,12-trien-3-one is added and the mixture stirred and then allowed to stand at about —20° for 24 hours. The mixture is then evaporated to yield 12,13-dichloro-5,9,13-trimethyltetradeca-4,6-dien-3-one, which can be purified by chromatography.

To a mixture of 5 g. of 5,9,13-trimethyltetradeca-4,6,12-trien-3-one in 100 ml. of fluorotrichloromethane is slowly added one equivalent of anhydrous fluorine at about —78°. After stirring the mixture at this temperature for about 16 hours, the resultant mixture is evaporated and chromatographed on silica to yield 12,13-difluoro-5,9,13-trimethyltetradeca-4,6-dien-3-one.

By using bromine, there is prepared 12,13-dibromo-5,9,13-trimethyltetradeca-4,6-dien-3-one.

EXAMPLE 70

To a mixture of 4 g. of 3,7,11-trimethyldodeca-2,4,10-trien-1-ol and 25 ml. of benzene at 0° is added a solution of 5 ml. of phosphorus tribromide in 18 ml. of benzene over about 15 minutes. The mixture is stirred at 0° for one hour. The mixture is then poured onto ice and extracted with pentane. The organic phase is washed with aqueous sodium bicarbonate, water and then brine, dried over magnesium sulfate and evaporated to yield 1-bromo-3,7,11-trimethyldodeca-2,4,10-triene.

The process of this example is repeated using each of the alcohols of Example 65 to prepare the respective bromide, i.e., 3,7,11-trimethyltrideca-2,4,10-trienyl bromide,
3,11-dimethyl-7-ethyltrideca-2,4,10-trienyl bromide,
7-11-diethyl-3-methyltrideca-2,4,10-trienyl bromide,
3,8,12-trimethyltrideca-2,4,11-trienyl bromide,
3,7,10-trimethylundeca-2,4,9-trienyl bromide,
3,7,10-trimethyldodeca-2,4,9-trienyl bromide,
3,6,10-trimethylundeca-2,4,9-trienyl bromide,
3,7,10,11-tetramethyldodeca-2,4,10-trienyl bromide,
11-methoxy-3,7,11-trimethyldodeca-2,4-dienyl bromide,
10-methoxy-3,7,10-trimethylundeca-2,4-dienyl bromide,
3,5,7,11-tetramethyldodeca-2,4,10-trienyl bromide,
3,4,7,11-tetramethyldodeca-2,4,10-trienyl bromide,
3,5,7,10,11-pentamethyldodeca-2,4,10-trienyl bromide,
11-ethoxy-3,7,11-trimethyldodeca-2,4-dienyl bromide,
11-chloro-3,7,11-trimethyldodeca-2,4-dienyl bromide.

By repeating the process of this example using phosphorus trichloride in place of phosphorus tribromide, the novel allylic chlorides are prepared, i.e., 3,7,11-trimethyldodeca-2,4,10-trienyl chloride, 3,7,11-trimethyltrideca-2,4,10-trienyl chloride, 3,11 - dimethyl-7-ethyltrideca-2,4,10-trienyl chloride, etc.

EXAMPLE 71

Ten grams of 1-bromo-3,7,11-trimethyldodeca-2,4,10-triene is mixed with 50 ml. of benzene, cooled to 5–10° and saturated with ammonia. The resulting mixture is stirred for four hours allowing the temperature to rise to about 20° while maintaining dry conditions. The mixture is washed with dilute sodium hydroxide and then evaporated under reduced pressure to yield 3,7,11-trimethyldodeca-2,4,10-trienylamine.

By repeating the process of this example using the allylic bromides or chlorides of Example 70, the respective amines are prepared, e.g., 3,7,11-trimethyltrideca-2,4,10-trienylamine, 3,11 - dimethyl-7-ethyltrideca-2,4,10-trienylamine, 11 - methoxy - 3,7,11 - trimethyldodeca-2,4-dienylamine, 10-methoxy-3,7,10-trimethylundeca-2,4-dienylamine, 11 - chloro-3,7,11-trimethyldodeca-2,4-dienylamine, etc.

EXAMPLE 72

Five grams of 1-bromo-3,7,11-trimethyldodeca-2,4,10-triene in 25 ml. of benzene is mixed with 4 g. of diethylamine and the mixture stirred for about three hours. Methylene chloride (50 ml.) is added and the mixture washed with dilute sodium hydroxide and then water and evaporated to yield N,N-diethyl 3,7,11-trimethyldodeca-2,4,10-trienylamine.

The process of this example is repeated using either the bromides or chlorides of Example 70 as the starting material to prepare the respective N,N-diethyl amine, e.g., N,N-diethyl 3,7,11 - trimethyltrideca-2,4,10-trienylamine, N,N-diethyl 3,11 - dimethyl-7-ethyltrideca-2,4,10-trienylamine, N,N-diethyl 11 - methoxy-3,7,11-trimethyldodeca-2,4-dienylamine, N,N-diethyl 10-methoxy-3,7,10-trimethylundeca-2,4-dienylamine, N,N-diethyl 11-chloro-3,7,11-trimethyldodeca-2,4-dienylamine, N,N-diethyl 3,7,10-trimethylundeca-2,4-dienyl amine, etc.

Other amines of the present invention of Formula A and B are prepared by use of the foregoing procedure using an amine of the formula:

such as dimethylamine, ethylamine, methylamine, pyrrolidine, morpholine, 4-ethylpiperazine, and the like, in place of diethylamine. Thus, there is prepared N,N-dimethyl 3,7,11-trimethyldodeca-2,4,10-trienylamine, N,N-dimethyl 3,7,11-trimethyltrideca-2,4,10-trienylamine, N-ethyl 3,7,11-trimethyldodeca-2,4,10-trienylamine, N-ethyl 3,7,11-trimethyltrideca-2,4,10-trienylamine, etc.

EXAMPLE 73

Each of isopropylamine, s-butylamine, di(hydroxyethyl)amine, allylamine, ethenylamine, piperazine, aniline, di(methoxyethyl)amine, cyclohexylamine, isobutylamine, t-amylamine and ethyl n-propylamine is reacted with 11-methoxy-3,7,11-trimethyldodeca-2,4 - dienyl bromide or chloride to prepare the respective amine:

N-isopropyl 11-methoxy-3,7,11-trimethyldodeca-2,4-dienylamine,
N-sec.-butyl 11-methoxy-3,7,11-trimethyldodeca-2,4-dienylamine,
N,N-di(hydroxyethyl) 11-methoxy-3,7,11-trimethyldodeca-2,4-dienylamine,
N-allyl 11-methoxy-3,7,11-trimethyldodeca-2,4-dienylamine,
N-ethenyl 11-methoxy-3,7,11-trimethyldodeca-2,4-dienylamine,
piperazino 11-methoxy-3,7,11-trimethyldodeca-2,4-dienylamine,
phenyl 11-methoxy-3,7,11-trimethyldodeca-2,4-dienylamine,
N,N-di(methoxyethyl) 11-methoxy-3,7,11-trimethyldodeca-2,4-dienylamine,
N-cyclohexyl 11-methoxy-3,7,11-trimethyldodeca-2,4-dienylamine,
N-isobutyl 11-methoxy-3,7,11-trimethyldodeca-2,4-dienylamine,
N-t-amyl 11-methoxy-3,7,11-trimethyldodeca-2,4-dienylamine,
N-ethyl-N-propyl 11-methoxy-3,7,11-trimethyldodeca-2,4-dienylamine.

EXAMPLE 74

To sodium hydride (0.7 g.), previously washed with hexane, under nitrogen, is added 75 ml. of dry tetrahydrofuran and then, after cooling to 0°, 5.1 g. of diethyl phosphonoacetonitrile is added slowly. The mixture is stirred for about 30 minutes and then added slowly to 6.8 g. of 6,10-dimethylundeca-3,9-dien-2-one at room temperature with stirring. The mixture is stirred for about 12 hours and then poured into saturated sodium chloride at 0°. The layers are separated and the organic layer dried over magnesium sulfate and evaporated to yield cis/trans 3,7,11-trimethyldodeca-2,4,10-trienenitrile.

The above process is repeated using each of the ketones of Column VI as the starting material to yield the respective nitrile:

3,7,11-trimethyltrideca-2,4,10-trienenitrile,
3,11-dimethyl-7-ethyltrideca-2,4-10-trienenitrile,
3-methyl-7,11-diethyltrideca-2,4,10-trienenitrile,
3,8,12-trimethyltrideca-2,4,11-trienenitrile,
3,7,10-trimethylundeca-3,4,9-trienenitrile,
3,7,10-trimethyldodeca-2,4,9-trienenitrile,
3,6,10-trimethylundeca-2,4,9-trienenitrile.

Following the process of this example, each of:

10-methoxy-6,10-dimethylundec-3-en-2-one,
10-hydroxy-6,10-dimethylundec-3-en-2-one,
10-methoxy-6,10-dimethyldodec-3-en-2-one,
9-methoxy-6,9-dimethylundec-3-en-2-one,
10-methoxy-6,9,10-trimethylundec-3-en-2-one, 6,9,10-trimethylundeca-3,9-dien-2-one and
6,8,9-trimethylundeca-3,9-dien-2-one is converted into the respective nitrile, i.e., 11-methoxy-3,7,11-trimethyldodeca-2,4-dienenitrile,
11-hydroxy-3,7,11-trimethyldodeca-2,4-dienenitrile,
11-methoxy-3,7,11-trimethyltrideca-2,4-dienenitrile,
10-methoxy-3,7,10-trimethyldodeca-2,4-dienenitrile,
11-methoxy-3,7,10,11-tetramethyldodeca-2,4-dienenitrile
3,7,10,11-tetramethyldodeca-2,4,10-trienenitrile and
3,7,9,10-tetramethyldodeca-2,4,10-trienenitrile.

Similarly, each of the other ketones under Column XVI is converted into the respective dienenitrile, e.g., 11-ethoxy-3,7,11-trimethyldodeca-2,4-dienenitrile.

EXAMPLE 75

By use of the process of Example 20, water is added to the terminal double bond of the tri-unsaturated amines, nitriles and C-1 halides of Formula B to produce the respective hydroxy derivatives, e.g., N,N-diethyl 11-hydroxy-3,7,11-trimethyldodeca-2,4-dienylamine,
N,N-diethyl 11 hydroxy-3,7,11-trimethyltrideca-2,4-dienylamine,
N,N-dimethyl 11-hydroxy-3,7,11-trimethyldodeca-2,4-dienylamine,
N-ethyl 11-hydroxy-3,7,11-trimethyldodeca-2,4-dienylamine,
N-methyl 11-hydroxy-3,7,11-trimethyldodeca-2,4-dienylamine,
11-hydroxy-3,7,11-trimethyldodeca-2,4-dienenitrile.

The thus-prepared free hydroxy compounds can be esterified using the procedure of, e.g., Examples 24 and 25, to form the respective esters, e.g., the respective 11-acetate.

EXAMPLE 76

To one g. of 3,7,11-trimethyldodeca-2,4,10-trien-1-ol in 20 ml. of dry ether is added one molar equivalent of diazoethane. One drop of boron-trifluoride is added and after one hour at 0° the mixture is washed with water and organic phase evaporated to yield the ethyl ether of 3,7,11-trimethyldodeca-2,4,10-trien-1-ol.

The use of diazomethane in the foregoing procedure affords 1-methoxy-3,7,11-trimethyldodeca-2,4,10-triene.

By use of the process of this example, there is prepared 1 - ethoxy - 11 - methoxy - 3,7,11-trimethyldodeca-2,4-diene, 1,11 - dimethoxy - 3,7,11 - trimethyldodeca - 2,4-diene and 1 - ethoxy - 11-acetoxy-3,7,11-trimethyldodeca-2,4-diene from the respective C-1 alcohol.

EXAMPLE 77

One g. of 3,7,11-trimethyldodeca-2,4,10-trien-1-ol in 10 ml. of diglyme is added dropwise to a slurry of 1 g. of sodium hydride in 10 ml. of diglyme under nitrogen. To this mixture is added 0.9 g. of cyclohexylchloride. The reaction mixture is stirred at about 25° for 30 minutes and then quenched in ice water, dried over sodium sulfate and evaporated to yield the cyclohexyl ether of 3,7,11-trimethyldodeca-2,4,10-trien-1-ol.

By use of the process of this example, the other alcohols of Example 65 are etherified to the respective cyclohexyl ether, i.e., 1 - cyclohexyloxy-3,7,11-trimethyltrideca - 2,4,10 - triene, 1-cyclohexyloxy-3,11-dimethyl-7 - ethyltrideca - 2,4,10-triene, etc.

By reacting cyclopentyl chloride, chloro benzene and benzyl chloride with the alcohols of Example 65 using the procedure of this example, the respective cyclopentyl ether, phenyl ether and benzyl ether are prepared.

EXAMPLE 78

To a suspension of 1. g. of sodium hydride in 10 ml. of tetrahydrofuran, under argon, and cooled to 4°, is slowly added 4 g. of p-ethylphenol in 15 ml. of tetrahydrofuran. The mixture is stirred for about eight hours. To the mixture, cooled in an ice-bath, is slowly added 4 g. of 3,7,11 - trimethyldodeca-2,4,10-trienylbromide in ether. After about two hours, the mixture is warmed to room temperature and allowed to stand for about 12 hours. The mixture is then poured into water and extracted with ether. The ethereal extracts are combined, washed with dilute aqueous sodium hydroxide, water and brine, dried over sodium sulfate and then evaporated to yield 3,7,11-trimethyldodeca-2,4,10-trienyl p-ethylphenyl ether.

By use of the above process, the other bromides of Example 70 can be converted into the respective p-ethylphenyl ether. Similarly, using other alcohols in place of p-ethylphenol in the process of this example, the corresponding ethers are prepared.

EXAMPLE 79

A mixure of 12 g. of 1-bromo-3,7,11-trimethyldodeca-2,4,10-triene, 8 g. of thiourea and 5 ml. of water is stirred and heated under reflux for about three hours. A solution of 6 g. of sodium hydroxide in 60 ml. of water is added and the mixture refluxed with stirring for about two hours. The mixture is diluted with water and separated. The organic phase is washed with water and dried over magnesium sulfate to yield 3,7,11-trimethyldodeca-2,4,10-trienylmercaptan, which can be purified by chromatography.

By use of the above process, other C-1 halides of Example 70 are converted into the corresponding thiol, e.g., 3,7,11-trimethyltrideca-2,4,10-trienylmercaptan, 3,11 - dimethyl-7-ethyltrideca - 2,4,10 - trienylmercaptan, 7,11-diethyl-3-methyltrideca - 2,4,10 - trienylmercaptan, 11-methoxy-3,7,11-trimethyldodeca-2,4-dienylmercaptan, etc.

EXAMPLE 80

To a solution of 2 g. of sodium in 50 ml. of methanol at 0° is added 4.5 g. of methylmercaptan. After about 0.5 hour, 20 g. of 1-bromo-3,7,11-trimethyldodeca-2,4,10-triene is added and then the mixture refluxed for about two hours.

The solvent is evaporated and the concentrate taken up in petroleum ether, which is washed with water, dried over magnesium sulfate and evaporated under reduced pressure to yield methylmercaptan, 3,7,11 - trimethyldodeca-2,4,10-trienyl (3,7,11 - trimethyldodeca-2,4,10-trienyl-thiomethane).

By repeating the process of this example using other halides of Example 70 as the starting material, the respective methyl thioethers are prepared, e.g., 3,7,11-trimethyltrideca-2,4,10-trienyl-thiomethane, 3,11 - dimethyl-7-ethyltrideca-2,4,10-trienyl-thiomethane, 7,11 - diethyl-3-methyltrideca-2,4,10-trienyl-thiomethane, etc.

Other thioethers of the present invention are prepared by reacting a mercaptan of the formula $R^{17}$—SH with an allylic halide of the present invention following the procedure of this example. Thus, the use of ethylmercaptan, benzylmercaptan, phenylmercaptan, cyclopentylmercaptan, and the like, in place of methylmercaptan, affords the respective thioether, e.g., 3,7,11-trimethyldodeca-2,4,10-trienyl-thioethane, 3,7,11 - trimethyltrideca-2,4,10-trienyl-thioethane, 3,11-dimethyl-7-ethyltrideca - 2,4,10 - trienyl-thioethane.

EXAMPLE 81

To a solution of 2 g. of sodium hydroxide in 40 ml. of methanol saturated with hydrogen sulfide is added 10 g. of 1-bromo-3,7,11-trimethyldodeca - 2,4,10 - triene. The mixture is stirred at about 25° for about five hours. The mixture is then diluted with water and extracted with petroleum ether. The organic phase is separated, washed well with water, dried over sodium sulfate and evaporated under reduced pressure to yield 3,7,11-trimethyldodeca-2,4,10-trienylmercaptan (3,7,11-trimethyldodeca - 2,4,10-trien-1-thiol), which can be purified by chromatography.

EXAMPLE 82

By use of the process of Example 14 or 39, other monochloride compounds of Formula A are prepared from the respective tri-unsaturated compound of Formula B. For example, from the respective tri-unsaturated precursor, there is prepared:

11-chloro-3,7,11-trimethyldodeca-2,4-dienenitrile,
11-chloro-3,7,11-trimethyltrideca-2,4-dienenitrile,
11-chloro-3,7,11-trimethyldodeca-2,4-dien-1-ol,
11-chloro-3,7,11-trimethyltrideca-2,4-dien-1-ol,
11-chloro-3,7,11-trimethyldodeca-2,4-dienyl bromide,
11-chloro-3,7,11-trimethyltrideca-2,4-dienyl bromide,
11-chloro-3,7,11-trimethyldodeca-2,4-dienylamine,
11-chloro-3,7,11-trimethyltrideca-2,4-dienylamine,
N,N-diethyl 11-chloro-3,7,11-trimethyldodeca-2,4-enylamine,
N,N-diethyl 11-chloro-3,7,11-trimethyltrideca-2,4-dienylamine,
1-ethoxy-11-chloro-3,7,11-trimethyltrideca-2,4-diene,
1-ethoxy-11-chloro-3,7,11-trimethyldodeca-2,4-diene,
11-chloro-3,7,11-trimethyldodeca-2,4-dienylmercaptan,
11-chloro-3,7,11-trimethyldodeca-2,4-dienylthiomethane, etc.

EXAMPLE 83

A mixture of 0.18 g. of NaH (rinsed with hexane), 5 ml. of tetrahydrofuran and 0.8 g. of diethyl diethylaminocarbonylmethyl phosphonate, under nitrogen, is stirred 0.5 hours at 0°. To the mixture is slowly added 1.0 g. of 10 - methoxy-6,10-dimethylundec-3-en-2-one. After addition is complete, the reaction is left at room temperature for about 30 minutes and then chromatographed on silica with ether to yield N,N-diethyl 11-methoxy-3,7,11-trimethyldodeca-2,4-dienoate (about 71.3% trans-2-trans-4), which can be further purified on silica plates.

EXAMPLE 84

To 8.2 g. of sodium isopropoxide (prepared by refluxing sodium and isopropanol) in 50 ml. of dimethylformamide is added 0.1 mole of 11-methoxy-3,7,11-trimethyldodeca - 2,4 - dienylbromide in dimethylformamide, with stirring and under nitrogen. The reaction mixture is stirred at room temperature until etherification is complete as followed by thin-layer chromatography. The mixture is then poured into water and ether added. The organic phase is separated, washed, dried and concentrated to yield 1-isopropoxy-11-methoxy-3,7,11-trimethyldodeca-2,4-diene, which is purified by chromatography.

By using sodium methoxide and sodium ethoxide in the process of this example, there is obtained 1,11-dimethoxy-3,7,11-trimethyldodeca-2,4-diene and 1-ethoxy - 11 - methoxy-3,7,11-trimethyldodeca-2,4-diene. The process of this example is useful for preparing other ethers of the present invention of Formula A by reaction of the allylic halide, e.g., the allylic bromides of Example 70, with the sodium salt of the appropriate alcohol which is selected according to the ether moiety desired. Thus, 1-isopropoxy-3,7,11-trimethyldodeca-2,4,10-triene is prepared from 3,7,11-trimethyldodeca-2,4,10-trienyl bromide.

EXAMPLE 85

Each of 5-indanol, sesamol, p-nitrophenol, p-chlorophenol, 2,3,4-trichlorophenol, 3-ethylphenol, p-t-butylphenol, p-ethoxyphenol, 3-ethyl-4-chlorophenol, 2-methyl-4-ethylphenol, 2-chloro-4-t-butylphenol, 2 - chloro-4,5-dimethylphenol, p-allylphenol, p-(1'-propenyl)phenyl, p-sec.-butylphenol, 3-chloro-4-ethylphenol, 2,4,6 - trichlorophenol, 3,4-dichlorophenol, 2,4-dichlorophenol, 2,4,5-trichlorophenol, 2,3,4,6-tetrachlorophenol, p-methylphenol, p-ispropylphenol, p-cyanophenol, p-methylthiophenol, p-methoxyphenol, p-ethylthiophenol and p - isopropylthiophenol is reacted with 11-methoxy - 3,7,11 - trimethyldodeca-2,4-dienylbromide using the procedure of Example 78 to prepare the respective ethers listed below.

11-methoxy-3,7,11-trimethyldodeca-2,4-dienyl indanyl ether,
11-methoxy-3,7,11-trimethyldodeca-2,4-dienyl 3,4-methylenedioxyphenyl ether,
11-methoxy-3,7,11-trimethyldodeca-2,4-dienyl p-nitrophenyl ether,
11-methoxy-3,7,11-trimethyldodeca-2,4-dienyl p-chlorophenyl ether,
11-methoxy-3,7,11-trimethyldodeca-2,4-dienyl 2,3,4-trichlorophenyl ether,
11-methoxy-3,7,11-trimethyldodeca-2,4-dienyl 3-ethylphenyl ether,
11-methoxy-3,7,11-trimethyldodeca-2,4-dienyl p-t-butylphenyl ether,
11-methoxy-3,7,11-trimethyldodeca-2,4-dienyl p-ethoxyphenyl ether,
11-methoxy-3,7,11-trimethyldodeca-2,4-dienyl 3-ethyl-4-chlorophenyl ether,
11-methoxy-3,7,11-trimethyldodeca-2,4-dienyl 2-methyl-4-ethylphenyl ether,
11-methoxy-3,7,11-trimethyldodeca-2,4-dienyl 2-chloro-4-t-butylphenyl ether,
11-methoxy-3,7,11-trimethyldodeca-2,4-dienyl 2-chloro-4,5-dimethylphenyl ether,
11-methoxy-3,7,11-trimethyldodeca-2,4-dienyl p-allylphenyl ether,
11-methoxy-3,7,11-trimethyldodeca-2,4-dienyl p-(1'-propenyl)phenyl ether,
11-methoxy-3,7,11-trimethyldodeca-2,4-dienyl p-sec.-butylphenyl ether,
11-methoxy-3,7,11-trimethyldodeca-2,4-dienyl 3-chloro-4-ethylphenyl ether,
11-methoxy-3,7,11-trimethyldodeca-2,4-dienyl 2,4,6-trichlorophenyl ether,
11-methoxy-3,7,11-trimethyldodeca-2,4-dienyl 3,4-dichlorophenyl ether,
11-methoxy-3,7,11-trimethyldodeca-2,4-dienyl 2,4,5-trichlorophenyl ether,
11-methoxy-3,7,11-trimethyldodeca-2,4-dienyl 2,3,4,6-tetrachlorophenyl ether,
11-methoxy-3,7,11-trimethyldodeca-2,4-dienyl p-methylphenyl ether,
11-methoxy-3,7,11-trimethyldodeca-2,4-dienyl p-isopropylphenyl ether,
11-methoxy-3,7,11-trimethyldodeca-2,4-dienyl p-cyanophenyl ether,
11-methoxy-3,7,11-trimethyldodeca-2,4-dienyl p-methylthiophenyl ether,
11-methoxy-3,7,11-trimethyldodeca-2,4-dienyl p-methoxyphenyl ether,
11-methoxy-3,7,11-trimethyldodeca-2,4-dienyl p-ethylthiophenyl ether,
11-methoxy-3,7,11-trimethyldodeca-2,4-dienyl p-isopropylphenyl ether.

Using the procedure of Example 78, each of methyl p-hydroxybenzoate, ethyl p-hydroxybenzoate, isopropyl p-hydroxybenzoate, methyl p-hydroxyphenylketone, N-ethyl p-hydroxybenzamide and N,N-diethyl p-hydroxybenzamide is alkylated using 11-methoxy-3,7,11-trimethyldodeca-2,4-dienylbromide to prepare:

methyl 4-(11'-methoxy-3',7',11'-trimethyldodeca-2',4'-dienyloxy) benzoate,
ethyl 4-(11'-methoxy-3',7',11'-trimethyldodeca-2',4'-dienyloxy) benzoate,
isopropyl 4-(11'methoxy-4',7',11'-trimethyldodeca-2',4'-dienyloxy) benzoate,
methyl 4-(11'-methoxy-3',7',11'-trimethyldodeca-2',4'-dienyloxy) phenyl ketone,
N-ethyl 4-(11'-methoxy-3',7',11'-trimethyldodeca-2',4'-dienyloxy) benzamide,
N,N-diethyl 4'(11'-methoxy-3',7',11'trimethyldodeca-2',4'-dienyloxy) benzamide.

Using the procedure of Example 78, each of 4-methylsulfonylphenyl, 2,4-dimethylthiophenol, 4-methylthio-3-ethylphenol and 4-methylthio-3,5-dimethylphenol is alkylated using 11-methoxy-3,7,11-trimethyldodeca-2,4-dienyl-bromide to prepare:

11-methoxy-3,7,11-trimethyldodeca-2,4-dienyl p-methylsulfonylphenyl ether,
11-methoxy-3,7,11-trimethyldodeca-2,4-dienyl 2,4-dimethylthiophenyl ether,
11-methoxy-3,7,11-trimethyldodeca-2,4-dienyl 4-methylthio-3-ethylphenyl ether,
11-methoxy-3,7,11-trimethyldodeca-2,4-dienyl 3,4-dichlorophenyl ether.

In the same way, ethers of the present invention of Formula B are prepared using the appropriate tri-unsaturated C–1 halide, e.g., 3,7,11-trimethyldodeca-2,4,10-trienyl bromide, as the alkylating agent.

EXAMPLE 86

Each of p-ethylphenyl mercaptan, 3,4-methylenedioxyphenyl mercaptan, p-methoxyphenyl mercaptan, p-ethoxyphenyl mercaptan, p-methylthiophenyl mercaptan, p-chlorophenyl mercaptan, p-nitrophenyl mercaptan, p-isopropylphenyl mercaptan, methyl p-thiolbenzoate, N-ethyl p-thiolbenzamide, N,N-diethyl p-thiolbenzamide and p-methylphenyl mercaptan is converted into the potassium salt and then alkylated using 11-methoxy-3,7,11-trimethyldodeca-2,4-dienylbromide to prepare the respective thioether;

1-(4'-ethylphenyl) thio-11-methoxy-3,7,11-trimethyldodeca-2,4-diene,
1-(3',4'-methylenedioxyphenyl) thio-11-methoxy-3,7,11-trimethyldodeca-2,4-diene,
1-(4'-methoxyphenyl) thio-11-methoxy-3,7,11-trimethyldodeca-2,4-diene,
1-(4'-ethoxyphenyl) thio-11-methoxy-3,7,11-trimethyldodeca-2,4-diene,
1-(4'-methylthiophenyl) thio-11-methoxy-3,7,11-trimethyldodeca-2,4-diene,
1-(4'-ethylthiophenyl) thio-11-methoxy-3,7,11-trimethyldodeca-2,4-diene,
1-(4'-chlorophenyl) thio-11-methoxy-3,7,11-trimethyldodeca-2,4-diene,
1-(4'-nitrophenyl) thio-11-methoxy-3,7,11-trimethyldodeca-2,4-diene,
1-(4'-isopropylphenyl) thio-11-methoxy-3,7,11-trimethyldodeca-2,4-diene,
methyl 4-(11'-methoxy-3',7',11'-trimethyldodeca-2',4'-dienyl) thiobenzoate,
N-ethyl 4-(11'-methoxy-3',7',11'-trimethyldodeca-2',4'-dienyl) thiobenzamide,
N,N-diethyl 4-(11'-methoxy-3',7',11'-trimethyldodeca-2',4'-dienyl) thiobenzamide,
1-(4-methylphenyl) thio-11-methoxy-3,7,11-trimethyldodeca-2,4-diene.

EXAMPLE 87

(A) To 210 ml. of a 0.5 M solution of soidum metaperiodate (aqueous methanol 1:1) at 0° is added 0.1 mole of 1-(4'-ethylphenyl) thio-11-methoxy-3,7,11 - trimethyldodeca-2,4-diene. The mixture is stirred at 0° for about four hours and then filtered. The filtrate is diluted with water and then extracted with chloroform. The extract is dried over magnesium sulfate and solvent removed by evaporation to yield 11-methoxy-3,7,11-trimethyldodeca-2,4-dienyl p-ethylphenyl sulfoxide, which can be purified by chromatography.

(B) To 200 ml. of aqueous methanol (1:1) containing 0.2 mole of sodium metaperiodate is added 0.1 mole of 1-(4'-ethylphenyl) thio-11-methoxy-3,7,11-trimethyldodeca-2,4-diene. The mixture is maintained at about 30° for six hours. After cooling, the mixture is filtered to remove precipitated sodium iodate. The filtrate is diluted with water and then extracted with chloroform. The extract is dried over magnesium sulfate and solvent removed by evaporation to yield 11-methoxy-3,7,11-trimethyldodeca-2,4-dienyl p-ethylphenyl sulfone, which can be purified by chromatography.

The processes of this example can be utilized to prepare other sulfoxides and sulfones of the present invention using other thioethers of Formula A or B as the starting material, such as the thioethers of Examples 80, 82 and 86.

Three groups of 30 each of *Aedes aegypti*, fourth instar larvae, in 50 ml. of tap water containing a few drops of liver powder suspension, room temperature of 28° and photoperiod of 18 hours, are treated with ethyl 11-methoxy-3,7,11-trimethyldodeca-2,4-dienoate (about 58% trans, trans) using 50 microliters of acetone as the carrier at three different dosage levels. A fourth group is maintained under identical conditions. Each group is scored after seven days by the following system: 0=normal adult, completely emerged (free or floating); 1=abnormal adult, non-viable; 2=incompletely emerged adult; 3=dead pupa; and 4=dead larvae. For each group the total number of animals in classes 1–4 is divided by 30 to determine the percentage result. The $ID_{50}$ is computed by plotting on semi-logarithmic paper, the dose on the horizontal axis and the percentage response on the vertical axis. The $ID_{50}$ was determined to be less than 1.0 p.p.m. Each of the larvae of the control group developed into normal adults. Each of the compounds, methyl 11-methoxy-3,7,11-trimethyldodeca-2,4-dienoate (about 91% trans, trans), ethyl 3,7,11-trimethyldodeca - 2,4,10 - trienoate (about 94% trans,trans), isopropyl 11-methoxy - 3,7,11 - trimethyldodeca-2,4-dienoate (56% trans,trans), isopropyl 11-hydroxy-3,7,11-trimethyldodeca-2,4-dienoate (78% trans, trans), ethyl 11 - hydroxy - 3,7,11 - trimethyldodeca-2,4-dienoate (85% trans,trans), 12-ethoxy-4,8,12-trimethyldodeca-3,5-dien-2-one, t-butyl 11-methoxy-3,7,11-trimethyldodeca - 2,4 - dienoate, 2' - methoxyethyl 11-methoxy-3,7,11-trimethyldodeca-2,4 - dienoate, 3' - thiacyclohexyl 11-methoxy-3,7,11-trimethyldodeca-2,4-dienoate and 2'-methylthioethyl 11 - methoxy - 3,7,11 - trimethyldodeca-2,4-dienoate were tested in the same way and found to have an $ID_{50}$ of less than 1.0 p.p.m.

Three groups of 20 each of *Tenebrio molitor* pupae (less than 24 hours old) maintained on wheat germ and bran, 25° room temperature, 18 hours light, are treated at 0.1, 1.0 and 10.0 μg. with isopropyl 11-methoxy-3,7,11-trimethyldodeca-2,4-dienoate (predominantly all trans) using acetone carrier. The active agent is placed on the 5th abdominal sternite using a syringe. The $ID_{50}$ was less than 0.1 μg.

Concentrate suitable for field application, with or without dilution depending upon spraying apparatus, can be formulated as follows (percentage by weight).

| | Percent |
|---|---|
| Isopropyl 11-methoxy-3,7,11-trimethyldodeca-2,4-dienoate (56% trans,trans) | 50 |
| Emcol N–140B | 12 |
| Emcol T–180 | 2 |
| Xylene | 36 |

Emcol N–140B, a blend of polyoxyethylene ethers and oil-soluble sulfonates, and Emcol T–180, are trade names for surfactants of Witco Chemical, New York, N.Y.

The above concentrate can be applied without dilution using ultra-low volume sprayers or can be diluted with, for example, water before application. Dilutions containing the active component within the range of about 0.0001% to 10% are generally employed. A dilution of the above concentrate with water to provide 1.0% of the active component, when applied to locals infested with immature peach aphids, provides effective control.

A fine dust is prepared of 10 parts of isopropyl 11-methoxy-3,7,11-trimethyldodeca-2,4-dienoate and 90 parts synthetic fine silica, by weight, by blending in a Waring blender. The fine dust is particularly useful for application to broadleaf plants for the control of cabbage looper, turnip aphids and squash vine borer.

Isopropyl 11-methoxy-3,7,11-trimethyldodeca-2,4-dienoate (56% trans,trans) is put neat on wheat to provide a concentration of 5 p.p.m. and super-blended. The treated wheat is placed in a large glass container and 20 viable adult Indian-meal moths (*Plodia interpunctella*) introduced. The same quantity of untreated wheat is placed in a large glass container and 20 viable adult Indian-meal moths introduced. The two groups are maintained under identical conditions for eight weeks. In the case of the treated grain, the 20 adults survived and the grain contained a few larvae and non-viable pupa, the larvae were not active and instead existed in diapause or pre-pupal-like state—indicates essentially complete control for protection of the grain. The untreated grain (control)—all adults survived and the grain was infested with hundreds of active larvae. The same treatment was made of other stored grain pests—i.e., Merchant grain beetle (*Oryzaephilus mercator*), Almond moth (*Codra cautella*) and Sawtoothed grain beetle (*Oryzaephilus surinamensis*) and provided essentially complete control by inhibiting adult emergence.

In some applications of the compounds of the present invention, it is advantageous to formulate the active compound of Formula A or B, such as an ester of Formula A with a polymeric material or a combination of polymer, filler, plasticizer and stabilizers. Thus, in the use of, e.g., an ester of Formula A as a control agent for mosquitos, the active compound can be blended with a polymer, such as polyvinyl chloride, and copolymers of polyvinyl chloride or ethylenepropylenediene terpolymers as described in U.S. 3,590,119 to extend the life and effectiveness for control of mosquito larvae. The density of blended or encapsulated material can be gauged so as to make it available at the most optimum water level. Polymeric blends and encapsulation of the active compounds of the present invention can be usefully applied to provide effective control of insects which harbor in the surface or under the surface of the soil as immature insects. Suitable polymers, blending techniques and encapsulation methods are described in U.S. Pats. 2,777,824; 3,055,297; 3,318,769; 3,393,990; 3,499,962; 3,551,556; 3,565,818; 3,565,559; 3,565,819 and 3,577,515.

Although not intending to be limited by a theoretical explanation, the effectiveness of the compounds of the present invention to control insects is attributed to the property of these novel compounds to mimic the activity of juvenile hormone as demonstrated herein. While the methods of applying and carriers for conventional insecticides are usually adaptable to the practical use of the compounds of the present invention, the mechanism of action of these novel compounds is unlike that of conventional insects. Whereas conventional insecticides are dependent upon direct knock-down effect, toxicity effect or paralyzing effect, the compounds of this invention achieve control by reason of their ability to inhibit metamorphosis, inhibit reproduction due to abnormal development, break diapause at an unfavorable time, or act as a direct insecticide, particularly at the embryo stage and larvae stage. Treatment of insects in accordance with the present invention can be achieved via ingestion of the active compound in the normal food of the insect and by topical application, that is, by contact of the epidermis of the insect as by spraying the insect and habitat of the insect or exposure to vapors of the active compound which penetrate into the insect.

The compounds of the present invention can be used in conjunction with other juvenile hormone active substances and conventional insecticides to obtain a broad spectrum of activity or to provide more immediate effect on very heterogeneous populations. Typical insecticides which may be combined with the compounds of the present invention are Malathion, Sevin, Vapona, Abate, synthetic and natural pyrethrins, and the like, and usually within the ratio of between 10:1 to 1:10, by weight.

The following is an example of a granule formulation in accordance with the present invention:

| | Percent |
|---|---|
| Attaclay 15–30 | 80 |
| Propylene glycol | 1 |
| Compound A or B | 19 |

Attaclay 15–30 is an attapulgus clay product of Minerals & Chemicals Philipp Corporation.

The following is an example of a water-dispersable powder formulation in accordance with the present invention:

| | Percent |
|---|---|
| Hil Sil 233 | 73.5 |
| Igepon-T-77 | 1.0 |
| Defoamer | 0.5 |
| Compound A or B | 25.0 |

Hi Sil is a trademark of PPG Industries. Igepon-T-77 is an anionic wetting agent of GAF Corporation. Defoamer is soap flakes but other defoamers can be used.

The following is an example of an emulsive formulation in accordance with the present invention:

| | Percent |
|---|---|
| Solvent | 14 |
| Atlox 3403F | 1 |
| Atlox 3404F | 3 |
| Compound A or B | 82 |

Solvent is xylene although other solvents can be used. Atlox is a trademark of Atlas Chemical Industries, Inc. The emulsive is diluted in water and applied. A deactivator, such as a tertiary amine, can be added to above formulation, usually in the amount of about 1% depending on shelf-life desired.

An example of a concentrate which can be applied without dilution using ultra-low volume sprayer is the following:

| | Percent |
|---|---|
| Solvent | 10–20 |
| Compound A or B | 80–90 |

Solvent can be xylene, heavy aromatic naphtha, and the like.

The foregoing formulations are presented as a guide for the formulation of compounds of Formula A and B, modifications thereof for optimum formulation according to the planned application habitat and shelf-life can be made by those of ordinary skill in the art using routine experimentation.

Aldehydes of Formula I where $n$ is one, can be prepared according to the following outlined procedure.

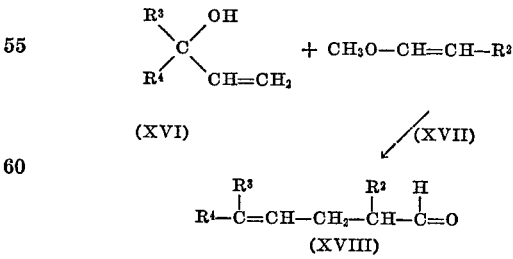

An aldehyde of Formula XVIII is prepared by the acid-catalyzed reaction of an allyl alcohol of Formula XVI with an aldehyde enol ether of Formula XVII. Suitable procedures are described in U.S. Pats. 3,453,317; 3,549,714; 3,493,619 and 3,493,621, which are incorporated by reference.

The reaction of an aldehyde of Formula XVIII with the ylid (Ph is phenyl) $Ph_3-P=CH-O-CH_3$ affords an aldehyde of Formula I where $m$ is one. The reaction can be done as follows: To a suspension of 21 grams of methoxymethyltriphenylphosphonium chloride in 200 ml.

of absolute ether is added under nitrogen at room temperature a solution of 60 mmoles of phenyl lithium in ether. After about 10 minutes, the mixture is cooled to —30° and 6 grams of 2,5-dimethylhex-4-en-1-al in ether is added slowly. After about 15 hours at room temperature, the mixture is filtered and the filtrate evaporated to yield the methoxymethylene of 2,5-dimethylhex-4-en-1-al which is dissolved in aqueous tetrahydrofuran containing a small amount of dilute hydrochloric acid and stirred to yield 3,6-dimethylhept-5-en-1-al. By repeating the ylid reaction on the thus-obtained aldehyde (3,6-dimethylhept-5-en-1-al), an aldehyde of Formula I wherein $m$ is 3, are prepared by again repeating the above ylid reaction.

Aldehydes of Formula I wherein $n$ is two or three, can be prepared as follows:

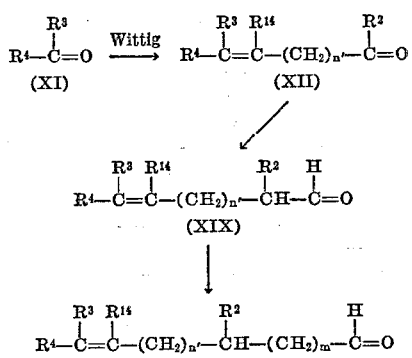

In the practice of the above process, a ketone of Formula XI, such as dimethylketone, diethylketone or methylethylketone, is reacted with a Wittig reagent of the formula ($\phi$ is phenyl):

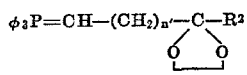

in an organic solvent, such as dimethylsulfoxide, or the like, to form the ethylene ketal of a compound of Formula XII, which is hydrolyzed by treatment with acid to the ketone (XII). The ketone (XII) is then reacted with the ylid of methoxymethyltriphenylphosphonium chloride in ether using butyl lithium or phenyl lithium followed by mild acid hydrolysis as described above to yield an aldehyde of Formula XIX. An aldehyde of Formula XIX is then reacted as before to prepare aldehyde of Formula I wherein $m$ is one, two or three. The following experiment illustrates conditions for preparation of the ketones of Formula XII.

To a solution of 20.9 g. of the ethylene ketal of 1-bromo-4-pentanone (obtained by treating 1-bromo-4-pentanone with ethylene glycol in benzene in the presence of p-toluene-sulfonic acid) in 100 ml. of benzene is added 20 g. of triphenylphosphine. The mixture is heated at reflux temperature for two hours and then filtered. The solid material thus-collected is washed with benzene, dried in vacuo and added 6.49 g. of butyl lithium in 50 ml. of dimethylsulfoxide. The mixture is stirred until an orange solution is obtained and 3.8 g. of methylethylketone is then added. The mixture is stirred at about 25° for about eight hours, poured into water and then extracted with ether. The ethereal extracts are concentrated and the concentrate added to 0.1 N solution of hydrochloric acid in aqueous acetone and stirred for about 15 hours. The mixture is then poured into ice water and extracted with ethyl acetate. The extracts are combined, washed with water, dried over sodium sulfate and evaporated to yield 6-methyl-5-octen-2-one, which is purified by chromatography and separated into the cis and trans isomer.

The above process is repeated with the exception of using an equivalent amount of the ethylene ketal of each of 1-bromo-4-hexanone, 1-bromo-3-butanone, 1-bromo-5-hexanone and 1-bromo-6-heptanone in place of the ethylene ketal of 1-bromo-4-pentanone to yield 7-methylnon-6-en-3-one, 5-methylhept-4-en-2-one, 7-methylnon-6-en-2-one and 8-methyldec-7-en-2-one, respectively.

By use of the above process, acetone is reacted with the phosphonium ylid prepared from the ehylene ketal of each of 1-bromo-4-pentanone, 1-bromo-4-hexanone, 1-bromo-3-butanone, 1-bromo-5-hexanone and 1 - bromo-6-heptanone to yield 6-m thylpent-5-en-2-one, 7-methyloct-6-en-3-one, 5-methylhex-4-en-2-one, 7-methyloct-6-en-2-one and 8-methylnon-7-en-2-one, respectively.

By using diethyl ketone in place of methylethyl ketone in the above process, there is prepared 6-ethyl-5-octen-2-one (XII; $R^2$ is methyl; $R^{14}$ is hydrogen; each of $R^3$ and $R^4$ is ethyl; and $n'$ is two).

EXAMPLE 88

One g. of 11-methoxy-3,7,11-trimethyldodeca-2,4-dien-1-ol in 10 ml. of dry pyridine is cooled to —10° and 2 ml. of acetic anhydride is added dropwise. The reaction is left about four hours at —10°. Then, ice water (about 5 ml.) is added dropwise. After about 0.5 hour, excess water is added and the mixture extracted with ether. The ethereal phase is washed with water, dried over calcium sulfate and solvent removed to yield 1 - acetoxy-11-methoxy-3,7,11-trimethyldodeca-2,4-diene.

By use of the foregoing procedure, other C–1 alcohols of Formula A and B are converted into the corresponding C–1 acetate. Likewise, by using other carboxylic anhydrides in the process of this example in place of acetic anhydride, the respective C–1 esters are prepared.

What is claimed is:

1. A compound selected from those of the Formula A:

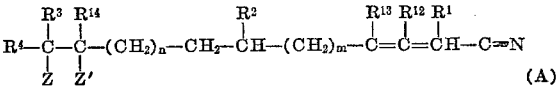

wherein,

Z is bromo, chloro, fluoro, or the group —OR in which R is hydrogen, lower alkyl, or acetyl;

Z' is hydrogen, bromo, chloro or fluoro;

each of $m$ and $n$ is zero or the positive integer one, two or three;

each of $R^1$ and $R^2$ is lower alkyl;

$R^4$ is alkyl of one to twelve carbon atoms; and each of $R^3$, $R^{12}$, $R^{13}$ and $R^{14}$ is hydrogen or lower alkyl.

2. A compound according to claim 1 wherein each of $R^1$, $R^2$ and $R^3$ is methyl or ethyl; $R^4$ is lower alkyl; each of $R^{12}$, $R^{13}$ and $R^{14}$ is hydrogen or methyl; $m$ is zero or one; $n$ is zero, one or two; Z is chloro or the group —OR; and Z' is hydrogen.

3. A compound according to claim 2 wherein $m$ is one; $n$ is zero or one; $R^4$ is mehyl or ethyl; each of $R^{12}$ and $R^{13}$ is hydrogen; and Z is chloro or the group —OR.

4. A compound according to claim 3 wherein $n$ is one; $R^{14}$ is hydrogen; and each of $R^1$, $R^2$ and $R^3$ is methyl.

5. A compound according to claim 3 wherein Z is methoxy or ethoxy.

6. A compound according to claim 5 wherein $R^4$ is methyl.

7. A compound according to claim 4 wherein Z is methoxy or ethoxy.

8. A compound according to claim 1 wherein each of $R^1$, $R^2$, $R^3$ and $R^4$ is methyl; each of $R^{12}$, $R^{13}$ and $R^{14}$ is hydrogen; each of $m$ and $n$ is one; Z' is hydrogen and Z is hydroxy, methoxy or ethoxy.

9. A compound according to claim 8 wherein Z is hydroxy.

10. A compound according to claim 8 wherein Z is methoxy.

11. A compound according to claim 8 wherein Z is ethoxy.

References Cited
UNITED STATES PATENTS

| | | | |
|---|---|---|---|
| 3,157,660 | 11/1964 | Stilz et al. | 260—465.6 X |
| 3,531,510 | 9/1970 | Blumenthal | 260—465.9 |
| 3,655,722 | 4/1972 | Mitchell et al. | 260—465.9 |
| 2,783,258 | 2/1957 | Celmer | 260—465.9 X |
| 3,655,700 | 4/1972 | Siddall | 260—405 |

JOSEPH P. BRUST, Primary Examiner

U.S. Cl. X.R.

260—247, 247.2 A, 247.7 A, 268 R, 268 C, 326.8, 399, 404, 405, 408, 410, 410.5, 410.6, 410.9 R, 413, 414, 455 R, 464, 465 D, 465 F, 465 G, 465.4, 465.7, 468 R, 473 R, 473 A, 473 C, 476 R, 478, 481 R, 482 R, 486 R, 487, 488 H, 502.6, 563 R, 570.5 R, 571, 576, 577, 583 H, 583 G, 584 R, 584 C, 586 R, 590, 593 H, 594, 601 H, 602, 607 A, 609 R, 609 E, 611 R, 612 R, 613 R, 614 R, 614 F, 615 R, 633, 635 R, 653.5, 654 R; 424—244, 248, 250, 256, 267, 275, 287, 298, 300, 304, 318, 320, 325, 330, 331, 333, 335, 337, 339, 343, 351